US010209832B2

United States Patent
Iyer et al.

(10) Patent No.: US 10,209,832 B2
(45) Date of Patent: Feb. 19, 2019

(54) DETECTING USER INTERACTIONS WITH A COMPUTING SYSTEM OF A VEHICLE

(71) Applicant: Google Inc., Mountain View, CA (US)

(72) Inventors: Rakesh Narayan Iyer, Santa Clara, CA (US); Joseph Onorato, Cambridge, MA (US)

(73) Assignee: Google LLC, Mountain View, CA (US)

(*) Notice: Subject to any disclaimer, the term of this patent is extended or adjusted under 35 U.S.C. 154(b) by 52 days.

(21) Appl. No.: 15/218,873

(22) Filed: Jul. 25, 2016

(65) Prior Publication Data

US 2018/0024695 A1    Jan. 25, 2018

(51) Int. Cl.
| | | |
|---|---|---|
| *G06F 3/00* | (2006.01) | |
| *G06F 3/042* | (2006.01) | |
| *G06F 3/01* | (2006.01) | |
| *G06F 3/0346* | (2013.01) | |
| *G06F 3/0488* | (2013.01) | |
| *H04N 5/33* | (2006.01) | |
| *B60K 37/06* | (2006.01) | |
| *G06F 3/0354* | (2013.01) | |

(52) U.S. Cl.
CPC ............ *G06F 3/0425* (2013.01); *B60K 37/06* (2013.01); *G06F 3/017* (2013.01); *G06F 3/0346* (2013.01); *G06F 3/03547* (2013.01); *G06F 3/04883* (2013.01); *H04N 5/33* (2013.01); *B60K 2350/1012* (2013.01); *B60K 2350/1028* (2013.01)

(58) Field of Classification Search
CPC .... G06F 3/04883; G06F 3/0425; G06F 3/017; G06F 3/0346; H04N 5/33
See application file for complete search history.

(56) References Cited

U.S. PATENT DOCUMENTS

| | | |
|---|---|---|
| 8,538,090 B2 | 9/2013 | Ishii |
| 8,842,919 B2 | 9/2014 | Katz et al. |
| 2002/0003571 A1* | 1/2002 | Schofield ................ B60C 23/00 348/148 |

(Continued)

FOREIGN PATENT DOCUMENTS

| | | |
|---|---|---|
| CN | 203930682 U | 11/2014 |
| EP | 2849033 A2 | 9/2014 |

OTHER PUBLICATIONS

International Search Report and Written Opinion from International Application No. PCT/US2017/042177, dated Sep. 20, 2017, 11 pp.

(Continued)

*Primary Examiner* — Muhammad N Edun
(74) *Attorney, Agent, or Firm* — Shumaker & Sieffert, P.A.

(57) ABSTRACT

A computing system of a vehicle for controlling a vehicle or systems within a vehicle. The computing system comprises a presence-sensitive panel within the vehicle, an infrared camera configured to capture images in a three-dimensional space within the vehicle, at least one processor; and at least one storage device that stores instructions. When the instructions are executed, they case the at least one processor to: receive, from the presence-sensitive panel, a first indication of input, receive, from the infrared camera, a second indication of input, and determine, based on at least one of the first indication of input or the second indication of input, an operation to be performed.

18 Claims, 13 Drawing Sheets

(56) References Cited

U.S. PATENT DOCUMENTS

| | | |
|---|---|---|
| 2008/0150913 A1 | 6/2008 | Bell et al. |
| 2014/0019913 A1* | 1/2014 | Newman ............... G06F 3/0488 |
| | | 715/810 |
| 2014/0157210 A1 | 6/2014 | Katz et al. |
| 2014/0300561 A1 | 10/2014 | Wäller et al. |
| 2014/0309870 A1* | 10/2014 | Ricci .................... H04W 48/04 |
| | | 701/36 |

OTHER PUBLICATIONS

A Microchip Technology Inc., A Touch Above World's First 2D Multi-Touch Pad with 3D Gesture Recognition, Micro Solutions, Nov./Dec. 2014, 34 pgs.

Steven Ashley, "Touch-less control coming to cars," Automotive Engineering, Mar. 4, 2014 4 pgs.

Response to Written Opinion dated Sep. 20, 2017, from International Application No. PCT/US2017/042177, filed Jan. 10, 2018, 15 pp.

Second Written Opinion of International Application No. PCT/US2017/042177, dated Jun. 1, 2018, 6 pp.

International Preliminary Report on Patentability from International Application No. PCT/US2017/042177, dated Oct. 15, 2018, 7 pp.

* cited by examiner

DETECTING USER INTERACTIONS WITH A COMPUTING SYSTEM OF A VEHICLE

BACKGROUND

Vehicles, such as automobiles, motorcycles, aircraft, and watercraft, may include one or more computing systems for performing functions and providing occupants of the vehicles with information, entertainment, assistance, or environmental control. For instance, an automobile may include an entertainment system for playing music, videos, or other content, a navigation system for providing information and navigational assistance, a temperature control system for heating or cooling the in-vehicle cabin, a control system for adjusting various components or features of the car, such as a sun roof or window shades, or an "infotainment system" that performs some or all of these aforesaid functions.

In some cases, a computing system within a vehicle may require, for effective operation, input from the driver or other occupant of the vehicle. For example, a computing system within a vehicle may require confirmation of a particular operation, or may require more specific information that might normally be expressed as voice input or as a string of characters. At times, a computing system within a vehicle may require input from the driver when the driver is unable to provide his or her full attention, such as when the driver's primary attention is on operating the vehicle.

SUMMARY

In one example, a computing system of a vehicle comprises a presence-sensitive panel within the vehicle, an infrared camera configured to capture images in a three-dimensional space within the vehicle, at least one processor, and at least one storage device. The storage device stores instructions that, when executed, cause the at least one processor to: receive, from the presence-sensitive panel, a first indication of input, receive, from the infrared camera, a second indication of input, and determine, based on at least one of the first indication of input or the second indication of input, an operation to be performed.

In another example, a method comprises receiving, by a computing system of a vehicle, from a presence-sensitive panel positioned within the vehicle, a first indication of input, receiving, by the computing system, from an infrared camera configured to capture images in a three-dimensional space within the vehicle, a second indication of input, and determining, based on at least one of the first indication of input or the second indication of input, an operation to be performed.

In another example, a computer-readable storage medium comprises instructions. The instructions, when executed by a computing system of a vehicle, cause at least one processor of the computing system to: receive, from a presence-sensitive panel positioned within the vehicle, a first indication of input, receive, from an infrared camera configured to capture images in a three-dimensional space within the vehicle, a second indication of input, and determine, based on at least one of the first indication of input or the second indication of input, an operation to be performed.

DETAILED DESCRIPTION

This disclosure is directed to techniques for enabling a single, multi-tiered input system to detect both fine-grained and course-grained user inputs for controlling one or more computing systems within a vehicle (also referred to herein as "vehicle computing systems"). For some controls, a vehicle system may require a more detailed or so-called fine-grained user input, such as when a vehicle computing system requests user input of a physical address used by a navigation application executing at the vehicle computing system or an email address used by a communication application running on the vehicle computing system. For other controls, a vehicle system may require a less detailed or so-called course-grained user input, such as when a vehicle computing system requests user input to confirm an operation or to control a cabin thermostat. And still for other controls, a vehicle system may require a combination of fine and course-grained inputs.

The example multi-tiered input system may provide a single user interface from which a user can easily switch between providing fine-grained and course-grained inputs. The example multi-tiered input system may rely on a touch panel configured to detect fine-grained user input from an occupant of the vehicle (e.g., primarily as two-dimensional gesture inputs made at or near an input surface of the touch panel) and using a camera positioned near the touch panel, the example multi-tiered input system may also be configured to detect course-grained user input (e.g., primarily as three-dimensional gesture inputs made in the air above the input surface of the touch panel).

The example multi-tiered input system may enable a vehicle computing system to detect both fine-grained input and course-grained input from a single system that is within easy reach of a vehicle occupant and may provide the vehicle occupant a way to quickly and easily switch between providing the appropriate input for a given situation. For example, even when the driver is operating the vehicle, the driver can interact with a single input system that easily switches between detecting fine-grained and course-grained inputs without requiring the driver to switch or change his or her input focus. Accordingly, a vehicle computing system that includes the example multi-tiered input system may provide a particularly natural or easy user interface from which the driver (or other vehicle occupant) can use to provide input to one or more systems within a vehicle.

Figure 1:
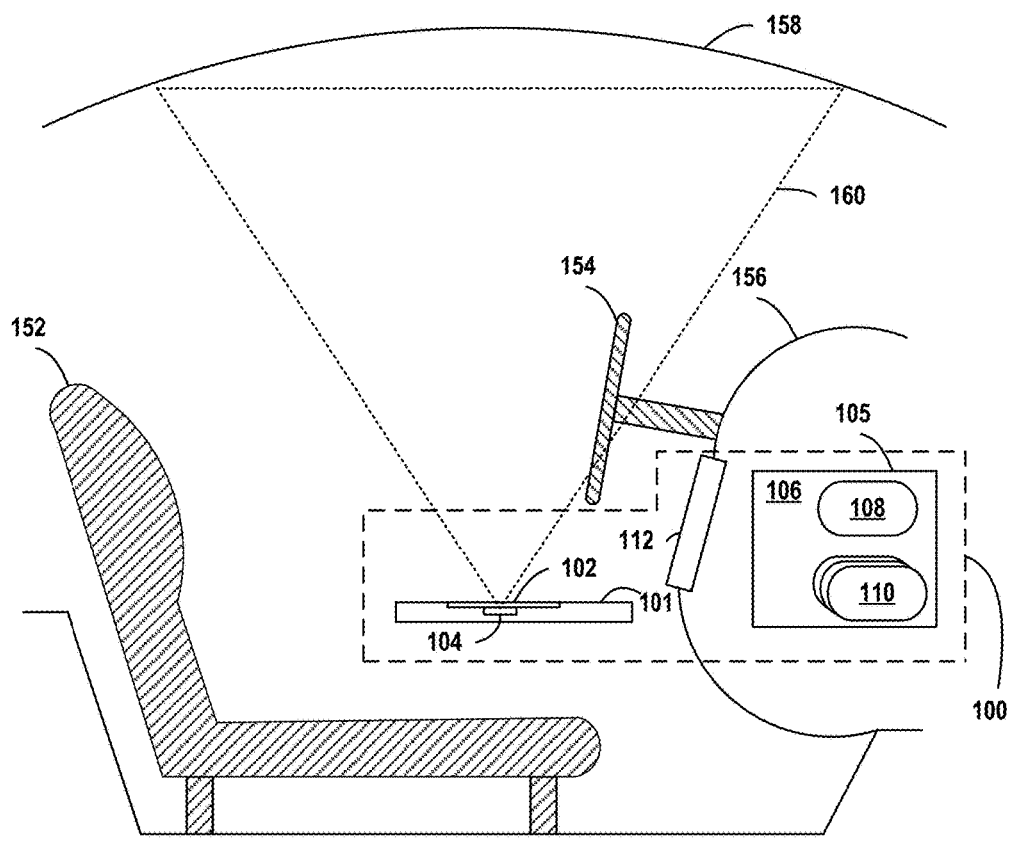
FIG. 1 is a conceptual diagram illustrating an interior of a vehicle that includes an example vehicle computing system enabling an occupant of the vehicle to control systems within the vehicle through multiple types of input.

FIG. 1 is a conceptual diagram illustrating an interior of a vehicle that includes an example vehicle computing system enabling an occupant of the vehicle to control systems within the vehicle through multiple types of input. FIG. 1 shows a cross-sectional view of a vehicle interior in addition to components of vehicle computing system 100. Vehicle computing system 100 is configured to detect and process user input, including both detailed or fine-grade input in a two-dimensional plane as well as less detailed or more course input in a three-dimensional space, in accordance with one or more aspects of the present disclosure.

The vehicle illustrated in FIG. 1 may be an automobile, but aspects of the present disclosure may also be applicable to other types of vehicles, including trucks, motorcycles, aircraft, watercraft, trains, or other vehicles. In FIG. 1, a driver may normally occupy seat 152. Seat 152 of the automobile may be positioned directly behind steering wheel 154 of the vehicle such that an occupant of seat 152 may physically control steering wheel 154. The seat 152 is positioned within the vehicle illustrated in FIG. 1 under roof 158. Steering wheel 154 may protrude from dashboard 156. At least one front passenger seat may be laterally positioned adjacent to seat 152. Other passenger seats may be positioned behind seat 152 or in front of seat 152.

Also shown in FIG. 1 is a collection of devices, components, and modules that may each be included in vehicle computing system 100. Vehicle computing system 100 includes, but is not limited to, presence-sensitive panel 102 and camera 104, as well as display 112 and control unit 106. One or more components of vehicle computing system 100, such as presence-sensitive panel 102 and camera 104 may be directly and physically accessible to occupants seated in the front driver and front passenger seats of the automobile, and may be located within, near, or on center console 101. Such components may be within easy reach of such occupants, and may also or alternatively be positioned in another passenger area of the vehicle, such as a back seat. In some examples, a component may be within easy reach if a vehicle occupant does not need to change positions in his or her seat in order to reach the component with an outstretched arm. Stated another way, for many drivers, for example, the usual positions of the steering wheel, stick shift, and center console may be considered within easy reach of the driver. As further described below, presence-sensitive panel 102 and camera 104 may function as input devices for vehicle computing system 100. In some examples, one or more components of vehicle computing system 100 that might not necessarily require physical access by occupants of the vehicle (such as, in some examples, display 112 and control unit 106), may be positioned in or on or integrated into dashboard 156. Such components may be integrated as part of an automobile dashboard and/or console facing or near the occupants of the vehicle. As further described in this disclosure, vehicle computing system 100 may include display 112 that may output a graphical user interface.

As described and illustrated, some or all of vehicle computing system 100 may be housed within dashboard 156, which may in some examples be constructed of plastic, vinyl, rubber, aluminum, steel, or any other suitable material. Control unit 106 may be housed within housing 105, which may also be constructed of plastic, vinyl, rubber, aluminum, steel, or any other suitable material. In some examples, housing 105 may also be a rigid case that encloses and otherwise protects one or more electrical components that provide functionality for vehicle computing system 100. In some examples, housing 105 may be affixed, mounted or otherwise integrated with the automobile dashboard or console.

Figure 2:
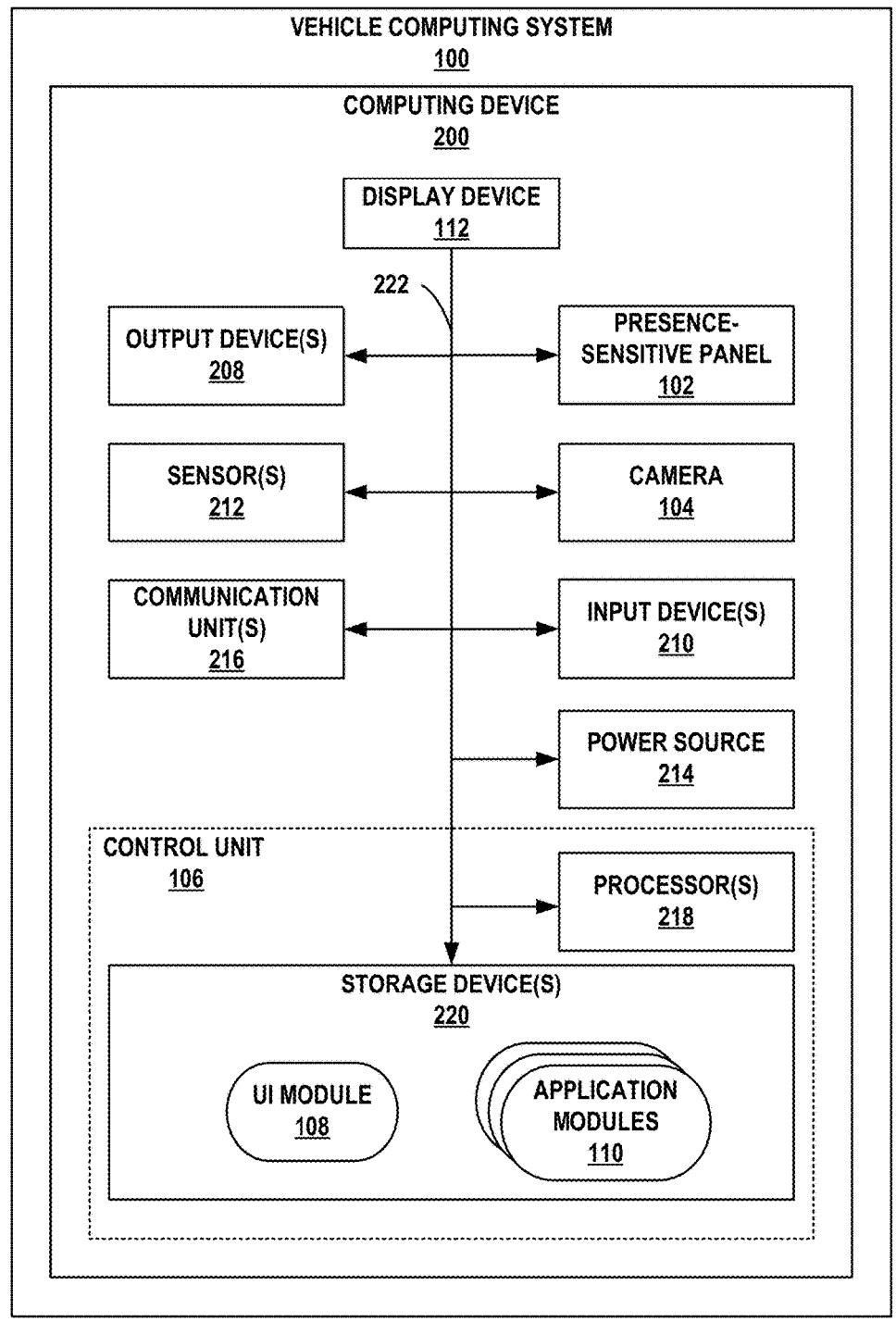
FIG. 2 is a block diagram illustrating an example vehicle computing system that implements techniques for controlling vehicle systems within a vehicle in accordance with one or more aspects of the present disclosure.

Control unit 106 may provide an operating environment or platform for one or one more modules, such as a combination of hardware, firmware, and software, as further illustrated in FIG. 2. For instance, control unit 106 may include one or more processors and storage devices that may execute instructions and store data of one or more modules. Control unit 106 may also be operably coupled to one or more other software and/or hardware components, including presence-sensitive panel 102, camera 104, and display 112 to control, configure, and/or communicate information with the components, to name only a few example operations.

Display 112 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to a user or vehicle occupant. In some examples, display 112 may also function as an input device, so that it serves as both an input and output device. In such examples, display 112 may include an integrated presence-sensitive input device and a display device. For instance, display 112 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Based on user input, display 112 may present output to a user. For instance, display 112 may present various user interfaces of applications (e.g., a navigation application) executing at vehicle computing system 100. An occupant of the vehicle, such as a driver, may provide user input to interact with one or more of such applications.

Vehicle computing system 100 may operate to assist, inform, entertain, or perform other tasks that require user interactions with occupants of a vehicle. Vehicle computing system 100 may be referred to as a vehicle head unit, an infotainment system, or a subcomponent thereof. For example, vehicle computing system 100 may include one or more application modules 110 that perform functions or process information, on behalf of one or more occupants of the vehicle. For instance, vehicle computing system 100 may provide a navigation service that provides directions to destinations. Vehicle computing system 100 may also provide an information retrieval service that provides information in response to queries and/or as preemptive assistance or recommendations. Vehicle computing system 100 may also provide vehicle data about the vehicle, or multimedia such as audio or video. Mentioned are only a few examples of the functionality that may be provided by vehicle computing system 100, and vehicle computing system 100 may provide many additional capabilities. In this and other ways, vehicle computing system 100 may improve the driving or riding experience for one or more occupants of the vehicle.

In some examples, vehicle computing system 100 may be controlled through input detected by presence-sensitive panel 102, through input detected by camera 104, and/or through input detected by a combination of presence-sensitive panel 102 and camera 104. Vehicle computing system 100 may also be controlled through input detected by one or more additional input devices (e.g., microphones, physical buttons or switches, or other types of input devices).

Presence-sensitive panel 102 may, in some examples, function simply as an input device for touch input, provided by user input that may occur directly and physically at presence-sensitive panel 102. For instance, presence-sensitive panel 102 may function as a multi-touch presence-sensitive input device using a presence-sensitive device, such as a resistive touchscreen or touch panel, a surface acoustic wave touchscreen or touch panel, a capacitive touchscreen or touch panel, a projective capacitance touchscreen or touch panel, a pressure-sensitive screen or touch panel, an acoustic pulse recognition touchscreen or touch panel, or another presence-sensitive screen or touch panel technology. In some examples, presence-sensitive panel 102 may detect an object at and/or near, or within range of the presence-sensitive component(s) associated with presence-sensitive panel 102. As one example range, presence-sensitive panel 102 may detect an object, such as a finger or stylus that is within 2 cm or less of presence-sensitive panel 102. Presence-sensitive panel 102 may determine a location (e.g., an (x,y) coordinate) of the presence-sensitive input device at which the object was detected. In another example range, presence-sensitive panel 102 may detect an object 6 inches or less from presence-sensitive panel 102; other ranges are also possible. In some examples, input detected by presence-sensitive panel 102 at ranges greater than 2 inches may be used as a depth signal in conjunction with input detected by camera 104. Presence-sensitive panel 102 may detect a user's finger, stylus, or similar using capacitive, inductive, and/or optical recognition techniques.

In the example illustrated in FIG. 1, presence-sensitive panel 102 may be positioned in center console 101 above camera 104, and center console 101 may be transparent to camera 104 so that camera 104 may capture images directly above presence-sensitive panel 102 even though presence-sensitive panel 102 physically obscures the lens or field-of-view of camera 104. For example, camera 104 may be an infrared camera that captures images by receiving infrared light and presence-sensitive panel 102 may be transparent to infrared light such that camera 104 is able to receive the infrared light originating between the roof 158 and presence-sensitive panel 102. In other examples, camera 104 might not be positioned directly under presence-sensitive panel 102, and camera 104 may be positioned elsewhere within the vehicle.

In some examples, presence-sensitive panel 102 may function as both an input device and as an output device. In such examples, presence-sensitive panel 102 may include an integrated presence-sensitive input device and a display device, and could be any one or more of a liquid crystal display (LCD), dot matrix display, light emitting diode (LED) display, organic light-emitting diode (OLED) display, e-ink, or similar monochrome or color display capable of outputting visible information to a user or vehicle occupant. In other examples where presence-sensitive panel 102 includes both input device and output device functionality, presence-sensitive panel 102 may be implemented by two separate components: a presence-sensitive input device for receiving input and a display device for providing output. In examples where presence-sensitive panel 102 includes both input device and output device functionality, presence-sensitive panel 102 may still be positioned in center console 101 above camera 104, and center console 101 may still be transparent to camera 104 so that camera 104 may capture images directly above presence-sensitive panel 102, even if positioned under presence-sensitive panel 102.

Camera 104 may be one or more of any appropriate type of image acquisition device, such as a camera or charge-coupled device. In some examples, camera 104 may be one or more infrared cameras with a high field-of-view and shallow depth of focus, and may be a backlit infrared camera oriented to point generally upward within the vehicle, having field-of-view 160. In other examples, camera 104 may be or may further include one or more other types of cameras or image sensors, which may include one or more other infrared cameras, thermographic cameras, thermal imaging cameras, light-sensitive cameras, range sensors, tomography devices, radar devices, or ultrasonic cameras. In some examples, camera 104 may be any image capture device appropriate for application of computer vision techniques. Depending on the type of sensors or cameras used, the resulting image may include two-dimensional images, three-dimensional volumes, or an image sequence. Pixel values typically correspond to light intensity in one or more spectral bands, but might also be related to various physical measures, such as depth, absorption or reflectance of sonic or electromagnetic waves, or nuclear magnetic resonance. Field-of-view 160 shown in FIG. 1 is illustrative, and other dimensions, shapes, or volumes of field-of-view 160 are possible.

In accordance with one or more aspects of the present disclosure, the combination of presence-sensitive panel 102 and camera 104 may serve as a combined "multi-tiered" input device that may be able to detect a variety of types of input, of varying degrees of detail. For instance, presence-sensitive panel 102 may be configured for detecting touch input directly at or physically near presence-sensitive panel 102 (e.g., with a finger or a stylus pen). Presence-sensitive panel 102 may detect one or more tap and/or non-tap gestures, continuous gestures, or any other touch gestures (e.g., multi-touch gestures) and vehicle computing system 100 may determine, based on the input detected by presence-sensitive panel 102, one or more symbols, gestures, or user commands corresponding to the input detected by presence-sensitive panel 102. Such a symbol, gesture, or command may be relatively detailed, and may include a hand-drawn number, character, or a string of characters determined from the detected input, and therefore presence-sensitive panel 102 may be used to capture what may be considered relatively detailed input or fine-grade input.

Camera 104 may be configured to capture movements of an occupant of the vehicle, such as a driver, as the occupant moves an arm, wrist, hand, stylus, and/or fingers as he or she gestures in, for example, field-of-view 160. Camera 104 may detect one or more images of a hand or arm signal, hand or arm movement, or gesture, and vehicle computing system 100 may be configured to determine, based on the input detected by camera 104, a user command or signal corresponding to the detected input. Vehicle computing system 100 may be configured to recognize a variety of user gestures or user movements. For example, input detected by camera 104 may be interpreted by vehicle computing system 100 as a gesture requesting an increase (or decrease) of an in-cabin temperature setting. In another example, input detected by camera 104 may be interpreted by vehicle computing system 100 as a gesture requesting an increase (or decrease) of sound system volume. In other examples, input detected by camera 104 may be interpreted by vehicle computing system 100 as a user gesture confirming or declining a particular operation. A user command corresponding to the input detected by camera 104 may be relatively less detailed, and may correspond to simply a hand swipe gesture, and therefore camera 104 may be used to capture what may be considered relatively less detailed input or more course input, at least compared to some input that may be detected by presence-sensitive panel 102.

Vehicle computing system 100 may use computer vision techniques to determine one or more user commands from the input detected by camera 104. In the example shown in FIG. 1, camera 104 may be pointing directly upwards, towards roof 158 of the vehicle, so in some examples, background subtraction and thresholding may be used to detect motion within field-of-view 160 (e.g., motion of a vehicle occupant's hand or arm). In such an example, vehicle computing system 100 may calculate the convex hull and calculate convexity defects and estimate, for example, the position of the vehicle occupant's hand in three dimensional space generally above presence-sensitive panel 102 and camera 104 (e.g., within field-of-view 160). Vehicle computing system 100 may alternatively or additionally determine gestures or movements in field-of-view 160 through alternative techniques.

As described above, vehicle computing system 100 may include user interface (UI) module 108 and application modules 110. UI module 108 and application modules 110 may perform operations described herein using software, hardware, firmware, or a mixture of both hardware, software, and firmware residing in and executing by vehicle computing system 100 or at one or more other remote computing devices. As such, UI module 108 and application modules 110 may be implemented as hardware, software, and/or a combination of hardware and software. Vehicle computing system 100 may execute UI module 108, application modules 110, or one or more other modules as or within a virtual machine executing on underlying hardware. UI module 108 and application modules 110 may be implemented in various ways. For example, UI module 108 and application modules 110 may be implemented as a downloadable or pre-installed application or "app." In another example, UI module 108 and application modules 110 may be implemented as part of an operating system of vehicle computing system 100.

Application modules 110 may include functionality to perform any variety of operations on vehicle computing system 100. For instance, application modules 110 may include a navigation application, weather application, a phone dialer application, an information retrieval application, a multimedia application, a vehicle information application, an email application, a text messaging application, instant messaging application, social networking application, weather application, stock market application, emergency alert application, sports application, to name only a few examples. In general, vehicle computing system 100, whether through application modules 110 or otherwise, may be configured to perform operations including those relating to climate control systems (e.g., heating and air conditioning), audio or infotainment systems, seat, window, sunshade, or windshield wipers, cruise control, in-cabin display system, steering wheel controls, headrest, arm rest, side or rear view mirrors, collision sensors. Such operations may be controlled by one or more application modules 110, or may be controlled by other systems within the vehicle. In some examples, such operations may be limited to non-safety features of the vehicle. In other examples, such operations may encompass one or more features of the vehicle that may be considered safety-related (e.g., turning on a turn-signal, adjusting a mirror, adjusting or fastening/disconnecting a seat belt, adjusting cruise control features, accelerating, braking).

Although shown as operable within control unit 106 of vehicle computing system 100, one or more of application modules 110 may be operable by a remote computing device that is communicatively coupled to vehicle computing system 100. In such examples, an application module executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from a computing device included in vehicle computing system 100. For instance, the remote computing device may be operatively coupled to vehicle computing system 100 by a network. An example of a remote computing device may include, but is not limited to a server, smartphone, tablet computing device, smart watch, and desktop computer. In some examples, a remote computing device may or may not be an integrated component of vehicle computing system 100.

UI module 108 of vehicle computing system 100 may receive from presence-sensitive panel 102 one or more indications of user input detected at presence-sensitive panel 102. Generally, each time presence-sensitive panel 102 detects user input at a particular location of presence-sensitive panel 102, UI module 108 may receive an indication of user input or information about the user input from presence-sensitive panel 102. UI module 108 may assemble the information received from presence-sensitive panel 102 into a set of one or more events, such as a sequence of one or more touch events or gesture events. Each gesture event in the sequence may include data or components that represent parameters (e.g., when, where, originating direction) characterizing a presence and/or movement of input at presence-sensitive panel 102. Each gesture event in the sequence may include a location component corresponding to a location of presence-sensitive panel 102, a time component related to when presence-sensitive panel 102 detected user input at the location, and/or an action component related to whether the gesture event corresponds to a lift up or a push down at the location.

UI module 108 may determine one or more characteristics of the user input based on the sequence of gesture events and include information about these one or more characteristics within each gesture event in the sequence of gesture events. For example, UI module 108 may determine a start location of the user input, an end location of the user input, a density of a portion of the user input, a speed of a portion of the user input, a direction of a portion of the user input, and a curvature of a portion of the user input. UI module 108 may transmit indications of user input from presence-sensitive panel 102 to other modules, such as application modules 110. UI module 108 may determine one or more single- or multi-touch gestures provided by a user. UI module 108 may also act as an intermediary between various components of vehicle computing system 100 to make determinations based on input detected by presence-sensitive panel 102 and generate output presented by display 112. For instance, UI module 108 may receive data from one or more application modules 110 and cause display 112 to output content, such as a graphical user interface, for display.

UI module 108 of vehicle computing system 100 may also receive from camera 104 one or more indications of user input detected by camera 104. Generally, each time camera 104 detects a user gesture or movement in field-of-view 160, UI module 108 may receive an indication of user input or information about the user input from camera 104. UI module 108 may assemble the information received from camera 104 into a set of one or more events, such as a sequence of movements or gesture events. Each gesture event in the sequence may include data or components that represents parameters (e.g., when, where in three dimensional space, originating direction, direction in three dimensional space, hand or arm orientation or posture) characterizing a presence, gesture, and/or movement captured by camera 104 within field-of-view 160. Each gesture event in the sequence may include a location component corresponding to a three-dimensional location within field-of-view 160, a time component related to when camera 104 detected user input within the three-dimensional space, an action component related to what type of gesture was made, and/or one or more images captured by camera 104.

UI module 108 may determine one or more characteristics of the user input based on the sequence of gesture events and include information about these one or more characteristics within each gesture event in the sequence of gesture events. For example, UI module 108 may determine a start location of the user gesture, an end location of the user gesture, a direction in three dimensional space within field-of-view 160 of the user gesture, a speed of the movement of the user gesture, a direction of at least a portion of the user gesture, and may also determine an interpretation of the type gesture that corresponds to the sequence of gesture events. UI module 108 may transmit indications of user input from camera 104 to other modules, such as application modules 110. UI module 108 may determine one or more gestures performed by a user. UI module 108 may also act as an intermediary between various components of vehicle computing system 100 to make determinations based on movements or gestures detected by camera 104 and generate output presented by display 112, and UI module 108 may receive data from one or more application modules 110 and cause display 112 to output content, such as a graphical user interface, for display.

In the example of FIG. 1, application modules 110 may include a navigation application that may be controlled through user input detected by presence-sensitive panel 102 and camera 104. In such an example, presence-sensitive panel 102 may detect one or more user inputs at locations of presence-sensitive panel 102. In response to detecting the one or more user inputs at locations of presence-sensitive panel 102, presence-sensitive panel 102 may output to UI module 108 an indication of user input detected by presence-sensitive panel 102. UI module 108 may output to the navigation application (one of application modules 110) information about the detected input. Responsive to the information about the input, the navigation application may determine a string of characters that corresponds to the input, and may use that string of characters as a destination address. The navigation application may present the determined address to the user by outputting, to UI module 108, the string of characters as part of a prompt to confirm the address as the desired destination. UI module 108 may format and display that prompt requesting confirmation of the address on display 112.

Camera 104 may detect one or more movements made by the driver within field-of-view 160, and in response to detecting the one or more movements within field-of-view 160, camera 104 may output to UI module 108 an indication of user input detected by camera 104. UI module 108 may output to the navigation application information about the detected input. Responsive to the information about the detected input, the navigation application may determine a command that corresponds to the input, and may interpret such command as the driver's confirmation that the destination address presented at display 112 is the desired destination address. In response, the navigation application may proceed to provide audio and/or visual navigation guidance to the desired destination. The navigation application may cause display 112 to output a graphical user interface for display that corresponds to a map. The navigation application may cause the graphical user interface to provide one or more directions to the specified destination. For instance, the one or more directions may be displayed by display 112 as turn-by-turn directions based on the vehicle's current location, a text list of directions, or a high-level map view with a progress indicator to the destination. During the drive, further input may be detected from the driver or other occupant of the vehicle. Such input may be provided at presence-sensitive panel 102. Such input may also be detected by camera 104 in response to gestures or movements made in field-of-view 160. While the driver is navigating the vehicle, gestures made in field-of-view 160 may be easier to perform than some input that may be provided at presence-sensitive panel 102.

In some examples, input detected by presence-sensitive panel 102 or camera 104 may be interpreted differently by vehicle computing system 100 depending on the application being executed by vehicle computing system 100 or the context or state of vehicle computing system 100. In other words, in the example above describing a navigation application, certain taps, gestures, movements, or other input may be interpreted in the context of the application. Such taps, gestures, movements, or other input may be interpreted differently if detected while another one of the application modules 110 (e.g., an infotainment application) is being executed or if the vehicle computing system 100 is in a different state or context. In still other examples, some taps, gestures, movements or other inputs may be interpreted by vehicle computing system 100 in a global manner, such that whenever such input is detected, the input is interpreted by vehicle computing system 100 the same way. For example, a particular gesture that may correspond to lowering the volume of one or more audio output devices, may lower the volume in most or all situations.

Although presence-sensitive panel 102 and camera 104 are described in FIG. 1 in the context of operation within a vehicle, in other examples, such an input system may be used in other contexts. For example, a presence-sensitive panel and camera that operates in a manner similar to that described in connection with FIG. 1 may be used in a desktop computing systems, mobile computing systems, laptops, mobile devices, or distributed computing systems, to name a few examples.

Since both fine-grained input and course-grained input can be detected by vehicle computing system 100, a vehicle occupant can provide input that is both safe and appropriate for a given situation. For example, when operating the vehicle, the driver might find it difficult to interact with a touchscreen or a presence-sensitive display for a number of reasons, including the lack of tactile feedback and the need to concentrate on operating the vehicle. Yet when the driver is operating the vehicle, and may be unable to devote full attention elsewhere, the driver may nevertheless be able to provide a course-grained gesture. Thus, in some situations, a course-grained gesture may be an appropriate, safe, convenient, and effective alternative to the driver finding and interacting with a physical button, knob, or switch, or a touchscreen button, icon, or interface. Also, in some cases, simple input is all that may be called for, and a course-grained gesture may be sufficient even if the driver is not operating the vehicle. Yet for cases in which fine-grained input is more appropriate, such as when the driver or other vehicle occupant is able to devote further attention to providing input, and/or where fine-grained or detailed input may be required, the vehicle computing system 100 is capable of detecting such input. Accordingly, in accordance with one or more aspects of the present disclosure, vehicle computing system 100 may be operated in a vehicle or driver-safe way through a full range of input types, including both low and high fidelity gestures, movements, taps, signals, and other types of input, as well as gestures, movements, taps, signals, and other types of input between those extremes.

Further, in some examples, the arrangement and/or placement of presence-sensitive panel 102 and camera 104 within the vehicle may provide an ergonomic and comfortable way for a driver (or other vehicle occupant) to interact with vehicle computing system 100. While presence-sensitive panel 102 and camera 104 may detect different types of input, the positioning of presence-sensitive panel 102 and camera 104 in accordance with one or more aspects of this disclosure may be such that input detected by presence-sensitive panel 102 may be perceived by a vehicle occupant to be a natural extension of input detected by camera 104. Similarly, input detected by camera 104 may be perceived by a vehicle occupant to be a natural extension of input detected by presence-sensitive panel 102. In other words, such a system may provide a particularly natural or easy user interface for a vehicle occupant to use. In some cases, a vehicle occupant may find interacting with vehicle computing system 100 to be relatively instinctive.

In some examples, vehicle computing system 100 or certain components of vehicle computing system 100 may be chosen to enable the overall cost of implementing vehicle computing system 100 to remain relatively low. It may be possible to implement vehicle computing system 100 using components that are relatively inexpensive, at least in comparison to alternative systems that may involve components different than, or in addition to, those described in accordance with one or more aspects of the present disclosure.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 2 is a block diagram illustrating an example vehicle computing system 100 that implements techniques for controlling vehicle systems within a vehicle in accordance with one or more aspects of the present disclosure. Computing device 200 of FIG. 2 is described below within the context of FIG. 1. FIG. 2 illustrates only one particular example of computing device 200, and many other examples of computing device 200 may be used in other instances and may include a subset of the components included in example computing device 200 or may include additional components not shown in FIG. 2. In the example of FIG. 2, vehicle computing system 100 includes one or more computing devices 200. In some examples, computing device 200 may be affixed, mounted or otherwise integrated with vehicle computing system 100.

As shown in the example of FIG. 2, computing device 200 may include presence-sensitive panel 102, camera 104, one or more input devices 210, power source 214, one or more processors 218, one or more storage devices 220, one or more output devices 208, one or more sensors 212, and one or more communication units 216.

Control unit 106 may encompass processors 218 and storage devices 220. Storage devices 220 may include UI module 108 and application modules 110. Communication channels 222 may interconnect one or more of the components identified above or shown in FIG. 2 for inter-component communications (physically, communicatively, and/or operatively). In some examples, communication channels 222 may include a system bus, a network connection, one or more inter-process communication data structures, or any other components for communicating data between hardware and/or software.

As shown in FIG. 2, control unit 106 may store and execute the data and instructions of one or more applications, modules or other software. Although FIG. 2 illustrates control unit 106 as including one or more processors 218 and one or more storage devices 220, control unit 106 may include more or fewer components than shown in FIG. 2.

For instance, control unit 106 may include one or more output devices, input devices, input/output ports or interface, sensors and/or communication units to name only a few examples. In other examples, control unit 106 may only include one or more processors. In most cases, control unit 106 may provide an operating environment for one or one more modules, such as UI module 108 and application modules 110.

One or more processors 218 may implement functionality and/or execute instructions within computing device 200. For example, processors 218 of computing device 200 may receive and execute instructions stored by storage devices 220 that provide the functionality of UI module 108 and application modules 110. These instructions executed by processors 218 may cause computing device 200 to store and/or modify information within storage devices 220 during program execution. Processors 218 may execute instructions of UI module 108 and application modules 110. That is, UI module 108 and application modules 110 may be operable by processors 218 to perform various functions described herein.

Presence-sensitive panel 102, camera 104, and/or one or more other input devices 210 of computing device 200 may receive input. Examples of input include tactile, audio, kinetic, and optical input, gestures, movements, and images, to name only a few examples. In addition to presence-sensitive panel 102 and camera 104, input devices 210 of computing device 200, in some examples, may include a mouse or equivalent device, keyboard, voice responsive system, video camera, buttons, control pad, microphone or any other type of device for detecting input from a human or machine. In some examples, such an input device may be a presence-sensitive input device, which may include a presence-sensitive screen or touch-sensitive screen to name only a few examples.

One or more output devices 208 of computing device 200 may generate, receive, or process output. Examples of output are tactile, audio, and video output. Output devices 208 of computing device 200, in one example, include a presence-sensitive screen, sound card, video graphics adapter card, speaker, cathode ray tube (CRT) monitor, liquid crystal display (LCD), or any other type of device for generating output to a human or machine. Output devices 208 may include display devices such as cathode ray tube (CRT) monitor, liquid crystal display (LCD), Light-Emitting Diode (LED) or any other type of device for generating tactile, audio, and/or visual output.

In some examples, display 112 is an output device such as cathode ray tube (CRT) monitor, liquid crystal display (LCD), Light-Emitting Diode (LED) or any other type of device for generating tactile, audio, and/or visual output.

In other examples, display 112 may include both input device and output device functionality. In such an example, display 112 may include a presence-sensitive input device, such as a presence-sensitive screen or touch-sensitive screen. Display 112 may detect an object at and/or near, or within range of the presence-sensitive component(s) associated with display 112. Display 112 may determine the particular location(s) on or near the surface of display 112 that have been selected by a user's finger, stylus, or similar using capacitive, inductive, and/or optical recognition techniques. In some examples where display 112 includes both input device and output device functionality, display 112 may be implemented by two separate components: a presence-sensitive input device for receiving input and a display device for providing output.

One or more communication units 216 of computing device 200 may communicate with external devices by transmitting and/or receiving data. For example, computing device 200 may use communication units 216 to transmit and/or receive radio signals on a radio network such as a cellular radio network. In some examples, communication units 216 may transmit and/or receive satellite signals on a satellite network such as a Global Positioning System (GPS) network. Examples of communication units 216 include a network interface card (e.g. such as an Ethernet card), an optical transceiver, a radio frequency transceiver, a GPS receiver, or any other type of device that can send and/or receive information. Other examples of communication units 216 may include Bluetooth®, GPS, 3G, 4G, and Wi-Fi® radios found in mobile devices as well as Universal Serial Bus (USB) controllers and the like.

One or more storage devices 220 within computing device 200 may store information for processing during operation of computing device 200. In some examples, one or more storage devices 220 are temporary memories, meaning that a primary purpose of the one or more storage devices is not long-term storage. Storage devices 220 on computing device 200 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 220 may store program instructions and/or data associated with UI module 108 and/or application modules 110.

As shown in FIG. 2, computing device 200 may include one or more sensors 212. Sensors 212 may include an accelerometer that generates accelerometer data. Accelerometer data may indicate an acceleration and/or a change in acceleration of computing device 200. Sensors 212 may include a gyrometer that generates gyrometer data. Gyrometer data may indicate a physical orientation and/or change in physical orientation of computing device 200. In some examples, the orientation may be relative to one or more reference points. Sensors 212 may include a magnetometer that generates magnetometer data. Magnetometer data may indicate the magnetization of an object that is touching or in proximity to computing device 200. Magnetometer data may indicate the Earth's magnetic field, and in some examples, provide directional functionality of a compass. Sensors 212 may include an ambient light sensor that generates ambient light data. The ambient light data may indicate an intensity of light to which computing device 200 is exposed. Sensors 212 may include a proximity sensor that generates proximity data. Proximity data may indicate whether an object is within proximity to computing device 200. In some examples, proximity data may indicate how close an object is to computing device 200. In some examples, sensors 212 may include a clock that generates a date and time. The date and time may be a current date and time. Sensors 212 may include temperature sensor that measures ambient temperature in proximity to sensors 212. The ambient temperature may indicate an intensity of temperature.

As shown in FIG. 2, computing device 200 may include a power source 214. In some examples, power source 214 may be a battery. Power source 214 may provide power to one or more components of computing device 200. Examples of power source 214 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 214 may have a limited capacity (e.g., 1000-3000 mAh).

In operation, presence-sensitive panel 102 may detect one or more taps, gestures, and/or other user inputs at locations of presence-sensitive panel 102. In response, presence-sensitive panel 102 may output to UI module 108 an indication of input detected by presence-sensitive panel 102. In some examples, UI module 108 may determine, based on the indication of input, information about the input. Such information may, for example, indicate one or more lines, characters, or shapes corresponding to the input. UI module 108 may output to one or more application modules 110 information about the input. In response to the information about the input, one or more application modules 110 may perform an operation. In some examples, one or more application modules 110 may output to one or more output devices 208, display 112, or any other component shown in FIG. 2, information about the input. In some examples, one or more application modules 110 may cause UI module 108 to update a graphical user interface to include information about the input, the operation, or an operation to be performed. Such a graphical user interface may be presented at display 112 or at another output device shown in FIG. 2.

Similarly, camera 104 may detect input in the form of one or more images of movements or gestures made within field of view 160. In response, camera 104 may output to UI module 108 an indication of input detected by camera 104. In some examples, UI module 108 may determine, based on the indication of input, information about the input. Such information may, for example, indicate one or more positions, motions, movements, sequences of movements, gestures, or gesture events corresponding to the input. UI module 108 may output to one or more application modules 110 information about the input. In response to the information about the input, one or more application modules 110 may perform an operation. In some examples, one or more application modules 110 may output to one or more output devices 208, display 112, or any other component shown in FIG. 2, information about the input. In some examples, one or more application modules 110 may cause UI module 108 to update a graphical user interface to include information about the input, the operation, or an operation to be performed. Such a graphical user interface may be presented at display 112 or at another output device shown in FIG. 2.

FIG. 3A through FIG. 3D illustrate one or more example operations relating to detecting input by presence-sensitive panel 102. For purposes of illustration, FIG. 3A through FIG. 3D are described within the context of vehicle computing system 100 of FIG. 1 and FIG. 2.

Figure 3A:
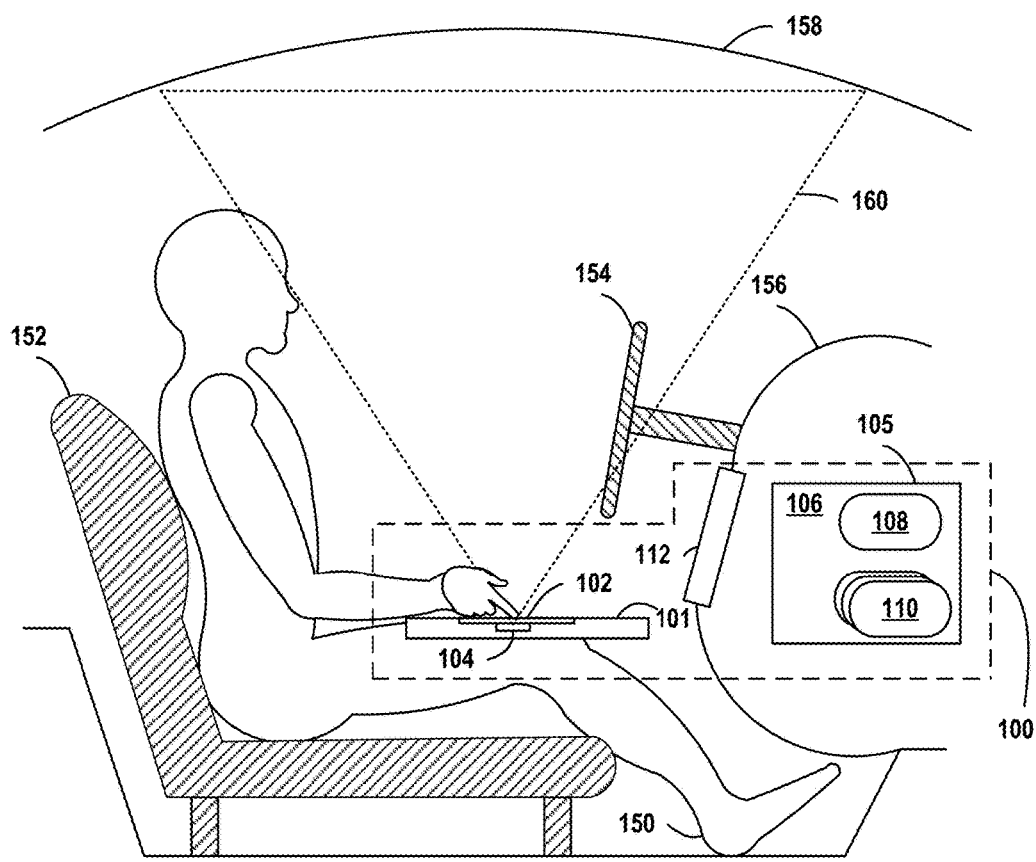
FIG. 3A is a conceptual diagram illustrating a side view of an interior of a vehicle, including an example vehicle computing system capable of detecting touch input in accordance with one or more aspects of the present disclosure.

FIG. 3A is a conceptual diagram illustrating a side view of an interior of a vehicle, including an example vehicle computing system 100 capable of detecting touch input in accordance with one or more aspects of the present disclosure. Seated on seat 152 is user 150. User 150 may be a driver, but user 150 could also be a passenger or other vehicle occupant. Although in FIG. 3A user 150 is shown in a position that may often be considered a front seat (characterized, e.g., by steering wheel 154 and dashboard 156), user 150 may be seated in another location within the vehicle, including a back seat.

In the example of FIG. 3A, user 150 may navigate or operate the vehicle, may interact with one or more components of the vehicle, and/or may provide input at input devices 210 or presence-sensitive panel 102 or camera 104. In FIG. 3A, user 150 is shown interacting with presence-sensitive panel 102.

Presence-sensitive panel 102 may detect one or more taps, gestures, and/or other user inputs at locations of presence-sensitive panel 102. Such taps, gestures, or other inputs may be from one or more fingers of user 150, or may be from a stylus or another device controlled by user 150. Such input may be on the surface of presence-sensitive panel 102, or within a threshold distance of the surface of presence-sensitive panel 102. In the illustration of FIG. 3A, the threshold distance may extend above presence-sensitive panel 102, towards roof 158. The threshold distance may extend to roof 158, or may extend an approximate distance, such as two feet, which may be appropriate to capture a hand raised by a passenger in a seated position to approximately shoulder height. A further distance is possible, but a shorter distance may reduce the potential for noisy signals, such as those created by shadows moving on the roof of the vehicle.

In response to detecting the one or more inputs at locations of presence-sensitive panel 102, presence-sensitive panel 102 may output to UI module 108 an indication of input detected by presence-sensitive panel 102. In some examples, UI module 108 may determine, based on the indication of input, information about the input. Such information may, for example, indicate one or more lines, characters, or shapes corresponding to the input. UI module 108 may output to one or more application modules 110 information about the input. In response to the information about the input, one or more application modules 110 may determine an operation corresponding to the input and/or perform an operation. In some examples, and in response to the information about the input, one or more application modules 110 may output to display 112 information about the input, the operation, or an operation to be performed.

Figure 3B:
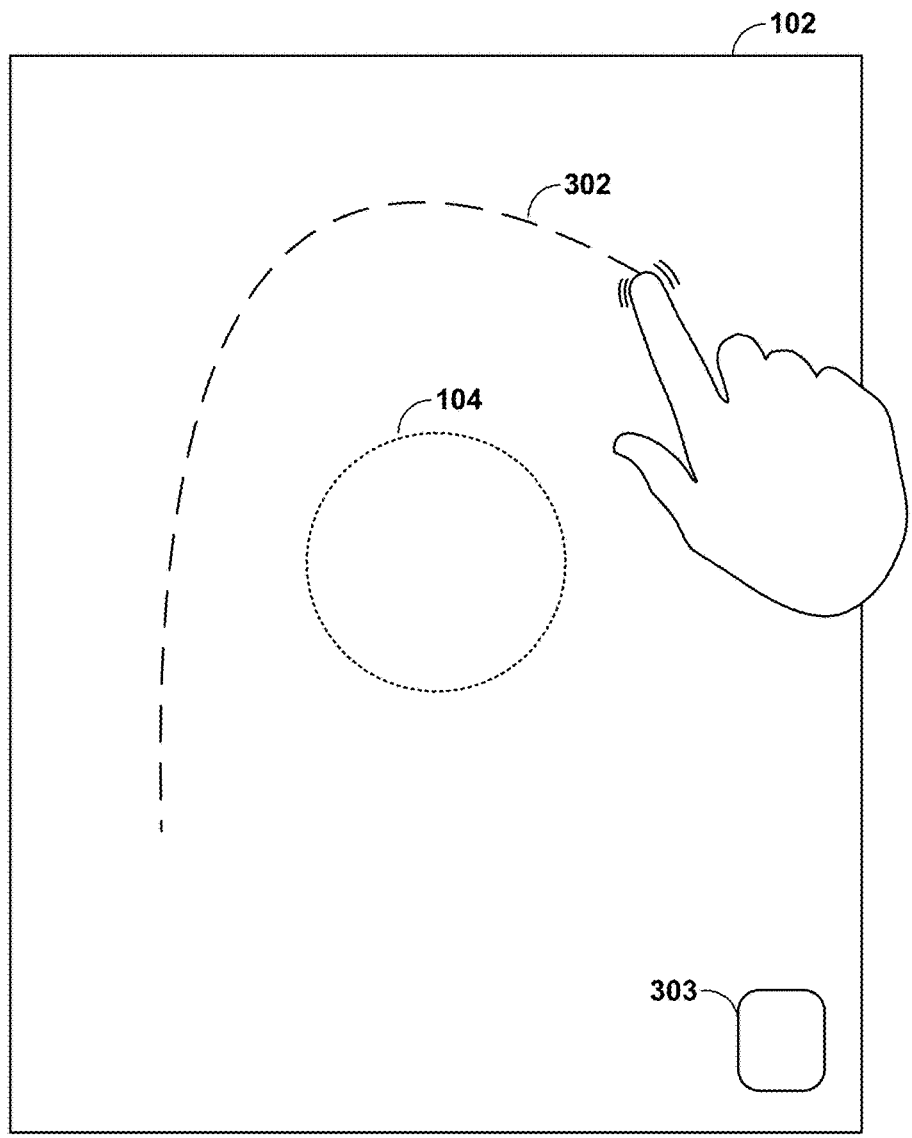
FIG. 3B is a conceptual diagram illustrating a top view of an example presence-sensitive panel.

FIG. 3B is a conceptual diagram illustrating a top view of an example presence-sensitive panel 102. In the example of FIG. 3B, camera 104 is mounted under presence-sensitive panel 102, and the position or location of camera 104 in FIG. 3B is illustrated by a dotted line, so in the view shown, camera 104 may be concealed. In some examples, presence-sensitive panel 102 may be transparent, or in other examples, presence-sensitive panel 102 may be at least partially transparent in some respects. For example, presence-sensitive panel 102 may be at least partially transparent to infrared light. Accordingly, in some examples, camera 104 may be partially visible through presence-sensitive panel 102. In some examples, presence-sensitive panel 102 may serve as both an input device and an output or display device. If presence-sensitive panel 102 is capable of operating as an output device, presence-sensitive panel 102 may present information or feedback in response to input detected, or may present a graphical user interface.

In FIG. 3B, presence-sensitive panel 102 may detect input along the surface of presence-sensitive panel 102, and computing device 200 may determine, based on the input, the coordinates, shape, and direction of line 302 traced by, for example, a finger or stylus along the surface of presence-sensitive panel 102. In other examples, computing device 200 may determine, based on the indication of input, one or more characters corresponding to the input. In still other examples, computing device 200 may determine, based on the indication of input, that the input corresponds to selection of a graphical user interface element presented on presence-sensitive panel 102, such as user interface element 303.

In some examples, presence-sensitive panel 102 may serve as an input device, but may also have full or partial display capability. For example, presence-sensitive panel 102 may detect input corresponding to a finger moved along line 302 on surface of presence-sensitive panel 102, and may output to UI module 108 an indication of input. In response to the indication of input, computing device 200 may cause a line or other representation of the input detected by presence-sensitive panel 102 to be presented on presence-sensitive panel 102 at or near line 302.

In some examples, computing device 200 may cause presence-sensitive panel 102 to present a graphical user interface, which may include one or more user interface elements 303. In such examples, presence-sensitive panel 102 may detect inputs at or near a location on presence-sensitive panel 102 where presence-sensitive panel 102 presents user interface element 303, and in response, computing device 200 may determine that the detected input corresponds to selection of user interface element 303. Responsive to such a determination, computing device 200 may perform an operation.

In other examples, presence-sensitive panel 102 may serve as an input device, without providing any display capability. In such an example, presence-sensitive panel 102 might not display any line or other feedback corresponding to input detected by presence-sensitive panel 102. Computing device 200 may cause feedback or other information responsive to input detected at presence-sensitive panel 102 to be displayed elsewhere, such as at display 112, as further described below.

Figure 3C:
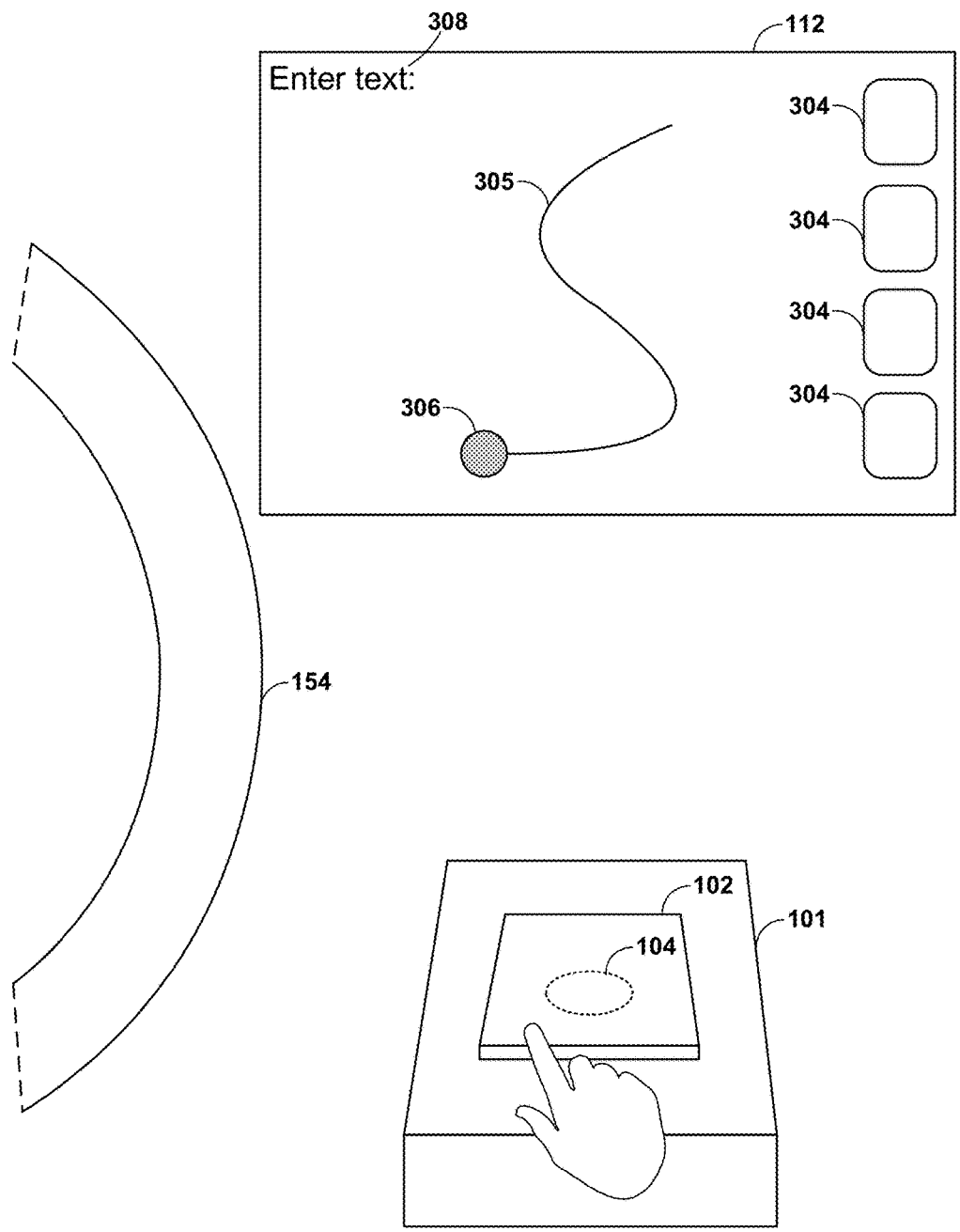
FIG. 3C is a conceptual diagram illustrating a perspective view from the rear of the interior of a vehicle, including an example vehicle computing system capable of detecting touch input in accordance with one or more aspects of the present disclosure.

FIG. 3C is a conceptual diagram illustrating a perspective view from the rear of the interior of a vehicle, including an example vehicle computing system 100 capable of detecting touch input in accordance with one or more aspects of the present disclosure. FIG. 3C illustrates center console 101 with camera 104 positioned on or within center console 101. Presence-sensitive panel 102 is positioned on top of camera 104 in a substantially horizontal position or orientation along center console 101. Presence-sensitive panel 102 may, in some examples, be within easy reach of the driver or other occupant(s) of the vehicle. Also shown in FIG. 3C is steering wheel 154, which may be on either side of center console 101, or in another location. Display 112, which may be within view of the driver or other occupant(s) of the vehicle, may present a graphical user interface. In the example of FIG. 3C, display 112 presents a graphical user interface that includes line 305, cursor 306, prompt 308, and one or more user interface elements 304.

UI module 108 of computing device 200 may receive indications of taps, gestures, and/or other input at locations of presence-sensitive panel 102. Computing device 200 may determine, based on the input, the shape of a line drawn along the surface of presence-sensitive panel 102. Computing device 200 may cause display 112 to present line 305, which may correspond to the shape of the line drawn along the surface of presence-sensitive panel 102. In this way, computing device 200 may provide visual feedback in response to input detected at presence-sensitive panel 102.

Computing device 200 may also or alternatively determine, based on the input at presence-sensitive panel 102, one or more characters corresponding to the input. In some examples, each time computing device 200 determines a character, computing device 200 may format and output for display at display 112 the determined character(s). Computing device 200 may determine a string of characters in this way, and may perform an operation based on the string characters. The string of characters may, for example, correspond to a physical address that may be used in a navigation application. In some examples, computing device 200 may format and output for display at display 112 the string of characters. In some examples, computing device 200 may alternatively, or in addition, format and output for display at presence-sensitive panel 102 one or more of such characters, for example, as one or more characters are determined.

Cursor 306 may be presented within the graphical user interface presented at display 112. In some examples, cursor 306 may act as a placeholder marking or corresponding to the most recent input at presence-sensitive panel 102. For instance, computing device 200 may cause cursor 306 to be displayed at a location on display 112 that corresponds to the location at presence-sensitive panel 102 where the last input was detected at presence-sensitive panel 102. In other words, if presence-sensitive panel 102 detects input corresponding to a line drawn on the surface of presence-sensitive panel 102, computing device 200 may position cursor 306 on display 112 at a location corresponding to where the last input was detected on presence-sensitive panel 102. If computing device 200 determines that the last input on presence-sensitive panel 102 was in the upper right hand corner of presence-sensitive panel 102, computing device 200 may position cursor 306 in the upper right hand corner of display 112. Similarly, if computing device 200 determines that the most recent input at presence-sensitive panel 102 was at the very center of presence-sensitive panel 102, computing device 200 may present cursor 306 at the very center of the graphical user interface presented at display 112.

In other examples, display 112 may present cursor 306 on the display or as part of a graphical user interface, and such a cursor 306 may operate in a different manner. In such examples, presence-sensitive panel 102 may operate as a trackpad, and cursor 306 may react to input at presence-sensitive panel 102 in a manner similar to a cursor displayed on a laptop screen having a trackpad for input. In such an example, computing device 200 may control the movement of cursor 306 on display 112 based on input detected at presence-sensitive panel 102. For instance, presence-sensitive panel 102 may detect one or more inputs, movements, or gestures along the surface of presence-sensitive panel 102. Computing device 200 may identify, based on the input, a direction of movement and a distance of movement. Responsive to such a determination, computing device 200 may move cursor 306 on display 112 in the determined direction of movement and for the determined distance of movement within the graphical user interface presented at display 112. In one example, computing device 200 may move cursor 306 so that cursor 306 overlaps one of user interface elements 304.

Figure 3D:
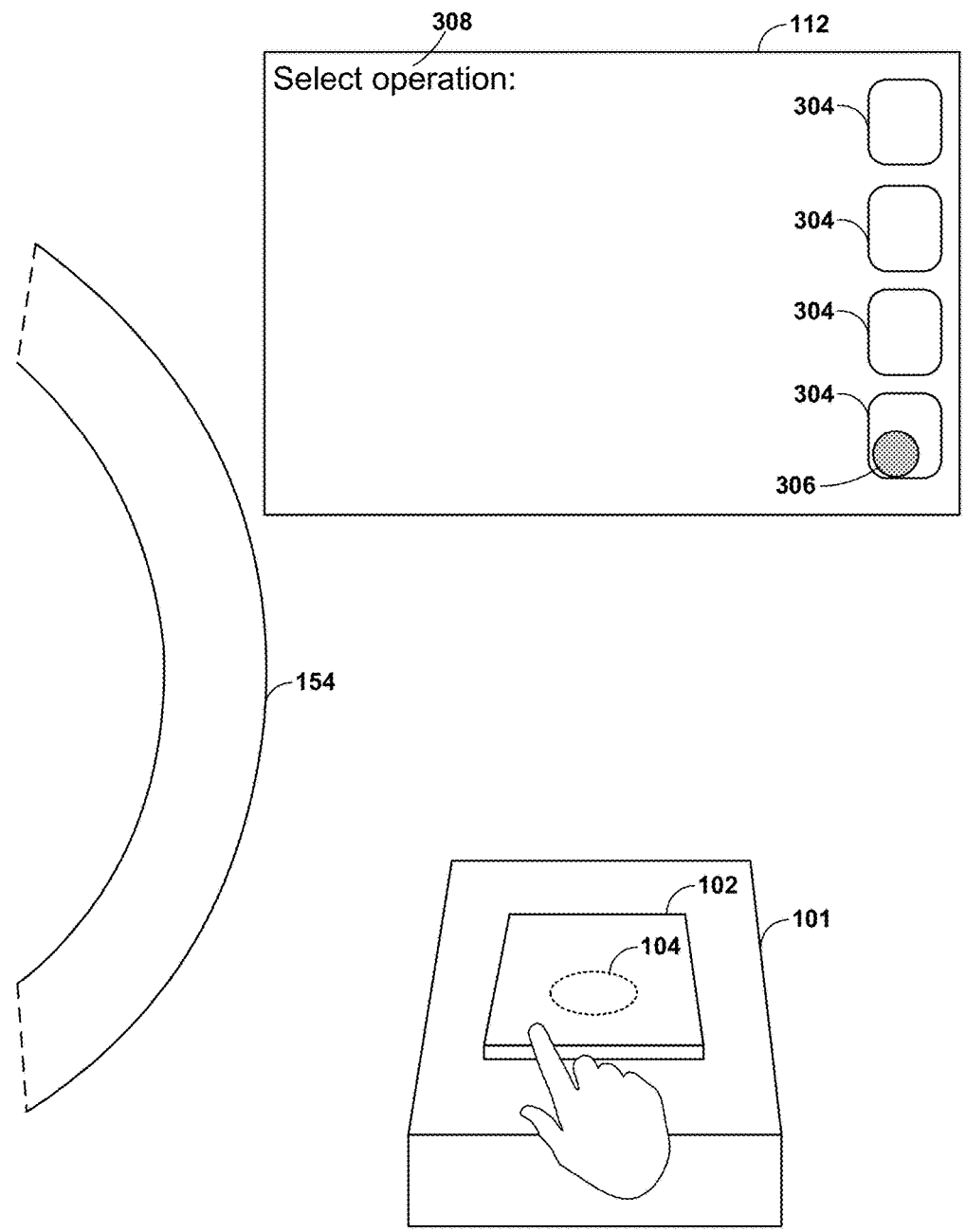
FIG. 3D is a conceptual diagram illustrating a perspective view from the rear of the interior of a vehicle, including an example vehicle computing system capable of providing feedback for touch input in accordance with one or more aspects of the present disclosure.

FIG. 3D is a conceptual diagram illustrating a perspective view from the rear of the interior of a vehicle, including an example vehicle computing system 100 capable of providing feedback for touch input in accordance with one or more aspects of the present disclosure. In FIG. 3D, computing device 200 has, in response to input detected at presence-sensitive panel 102, moved cursor 306 so that cursor 306 overlaps one of user interface elements 304. When cursor 306 is over one of user interface elements 304, presence-sensitive panel 102 may detect one or more taps or inputs at presence-sensitive panel 102, and computing device 200 may determine, based on this input, that the input corresponds to selection of the user interface elements 304 overlapped by cursor 306. Alternatively, after cursor 306 is moved over one of user interface elements 304, camera 104 may detect input in the form of one or more images of an arm or hand within field of view 160, and computing device 200 may determine, based on this input detected by camera 104, that the input corresponds to selection of the user interface element 304 overlapped by cursor 306. Responsive to detecting input corresponding to selection of user interface element 304, computing device 200 may perform an operation corresponding to the user interface element 304 overlapped by cursor 306.

In some examples, display 112 may be a presence-sensitive panel that operates both as an input device and an output device. In such an example, display 112 may detect one or more inputs at or near a location on display 112 where display 112 presents user interface element 304. Computing device 200 may identify, based on the input, a selected user interface element 304 corresponding to the input. In response to the input selecting user interface element 304, computing device 200 may perform an operation, which may include displaying information or updating a graphical user interface at display 112. In some examples where presence-sensitive panel 102 also acts as a display, computing device 200 may additionally or alternatively display information at presence-sensitive panel 102 or update a graphical user interface displayed at presence-sensitive panel 102.

FIG. 4A through FIG. 4D illustrate one or more example operations relating to detecting input by camera 104. For purposes of illustration, FIG. 4A through FIG. 4E are described within the context of vehicle computing system 100 of FIG. 1 and FIG. 2.

Figure 4A:
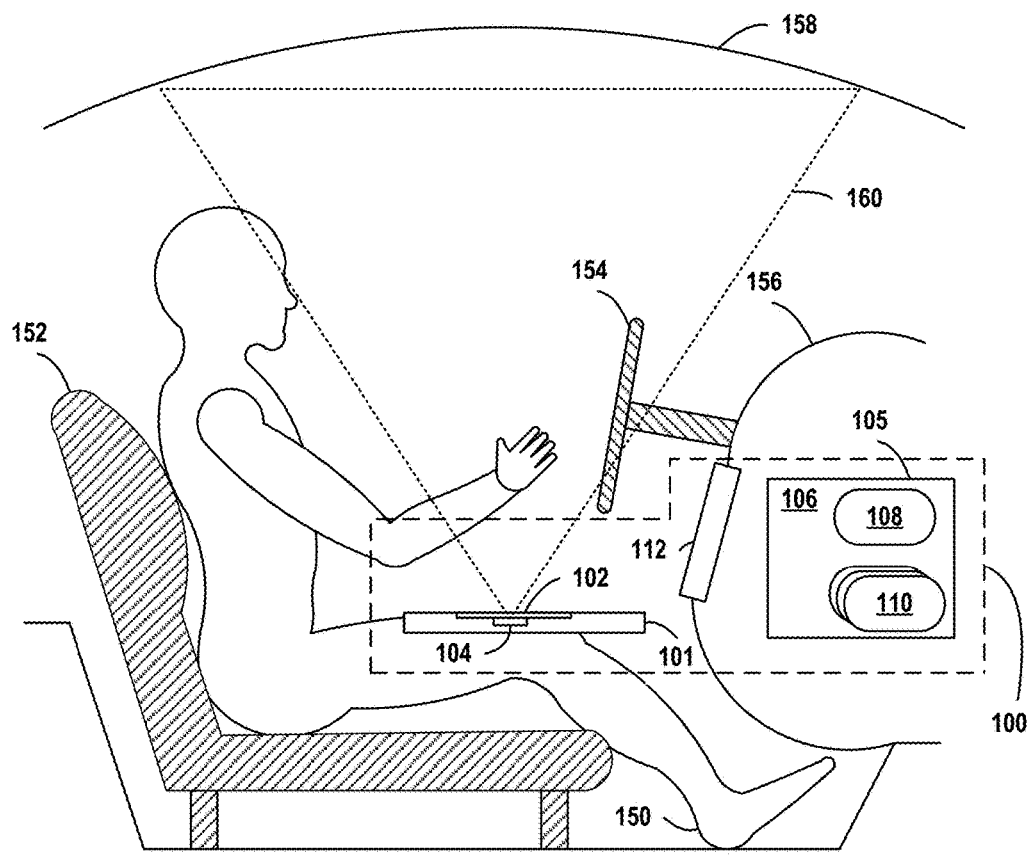
FIG. 4A is a conceptual diagram illustrating a side view of an interior of a vehicle, including an example vehicle computing system capable of detecting gesture input in an example field of view in accordance with one or more aspects of the present disclosure.

FIG. 4A is a conceptual diagram illustrating a side view of an interior of a vehicle, including an example vehicle computing system 100 capable of detecting gesture input in an example field of view 160 in accordance with one or more aspects of the present disclosure. Seated on seat 152 is user 150. As in FIG. 3A through FIG. 3D, user 150 may be a driver, passenger, or other vehicle occupant. User 150 may be seated in the front seat or at another location within the vehicle.

In the example of FIG. 4A, user 150 may interact with one or more components of the vehicle, and/or provide input at input devices 210 or presence-sensitive panel 102 or camera 104. In FIG. 4A, user 150 is shown interacting with camera 104.

Camera 104 may detect input including images of one or more movements or gestures made by user 150 within field of view 160. Such movements or gestures may be hand movements, arm movements, or finger gestures within field of view 160. In some examples, such movements may be within field of view 160 but outside the threshold distance previously described in connection with presence-sensitive panel 102, where such a threshold distance may be measured upward from the surface of presence-sensitive panel 102. Camera 104 may be positioned or configured so that field of view 160 is located within the vehicle such that user 150 performing a movement or a gesture intended as input for camera 104 might require user 150 to lift his or her arm or hand off center console 101 little or no distance. Camera 104 may be positioned or configured such that user 150 performing a movement or a gesture within field of view 160 as input for camera 104 is less likely to have such a movement or gesture be interpreted as an attempt to communicate with someone outside the vehicle. In other words, in some examples camera 104 and field of view 160 may be positioned low enough within the vehicle so that a pedestrian, for example, is less likely to see gestures that user 150 or a driver or vehicle occupant may perform within the vehicle for detection by camera 104.

Computing device 200 may determine, based on the input detected by camera 104, a command or operation corresponding to the input. Computing device 200 may perform the command or operation, or may cause display 112 to display information about the command or operation, or the command or operation to be performed. For instance, computing device 200 may present a prompt at display 112 relating to the command or operation.

Figure 4B:
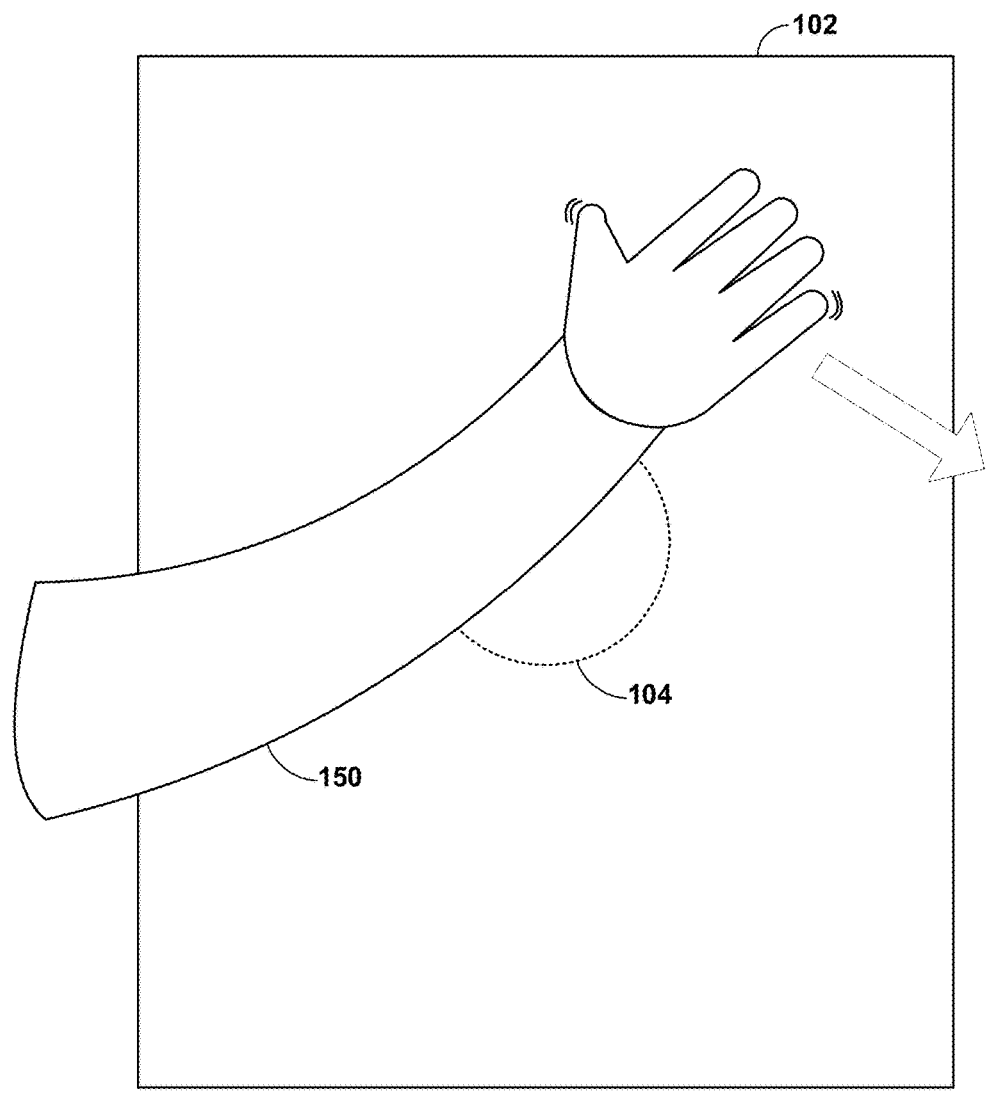
FIG. 4B is a conceptual diagram illustrating a top view of an example presence-sensitive panel and an example camera.

FIG. 4B is a conceptual diagram illustrating a top view of an example presence-sensitive panel 102 and an example camera 104. In the example of FIG. 4B, camera 104 is mounted in the manner shown in FIG. 4A, under presence-sensitive panel 102. Camera 104 may be an infrared camera, and presence-sensitive panel 102 may be transparent to infrared light, so that camera 104 is able to capture images above presence-sensitive panel 102. An infrared camera may, in some examples, enable effective capture of images during conditions of low levels of ambient light (e.g., at night), and during conditions of high levels of ambient light (e.g., in a convertible on a sunny day, or when a sunroof provides significant light through roof 158). An infrared camera may be more appropriate than other types of cameras, such as an optical camera, in certain varying light conditions.

In FIG. 4B, camera 104 may detect one or more images of an arm movement. Computing device 200 may determine, based on the one or more images, that the arm may be moving in the direction indicated in FIG. 4B. Computing device 200 may further determine that such a movement corresponds to a swiping gesture.

Figure 4C:
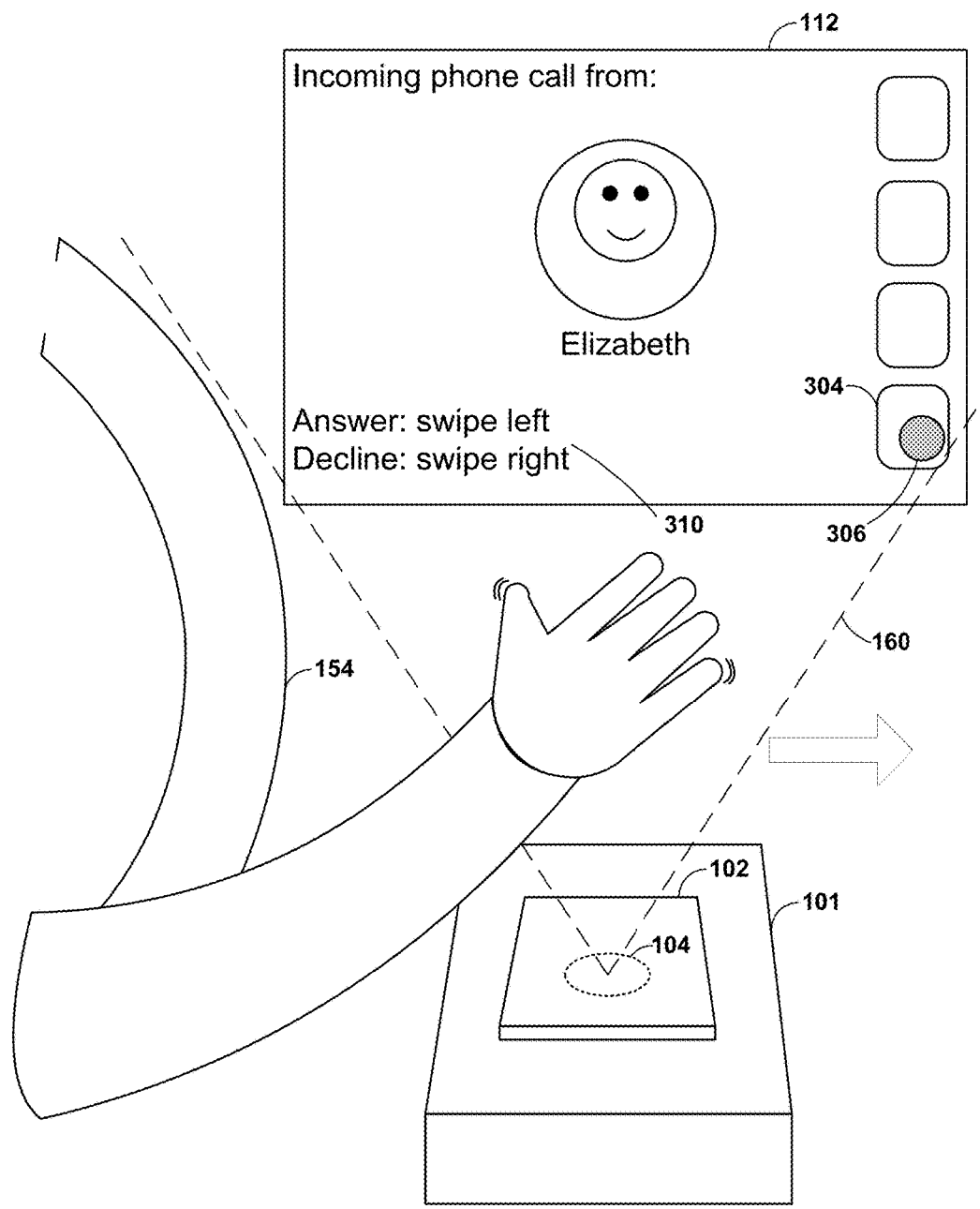
FIG. 4C is a conceptual diagram illustrating a perspective view from the rear of the interior of a vehicle, including an example vehicle computing system capable of detecting gesture input in accordance with one or more aspects of the present disclosure.

FIG. 4C is a conceptual diagram illustrating a perspective view from the rear of the interior of a vehicle, including an example vehicle computing system 100 capable of detecting gesture input in accordance with one or more aspects of the present disclosure. FIG. 4C illustrates center console 101 with camera 104 positioned on or within center console 101. As in FIG. 4B, presence-sensitive panel 102 is positioned on top of camera 104, but camera 104 may nevertheless capture images above presence-sensitive panel 102 within field of view 160.

In the example of FIG. 4C, computing device 200 has detected an incoming phone call from one or more of communication units 216, and has caused display 112 to present a prompt 310 requesting that user 150 answer or decline the call. Camera 104 detects input in the form of one or more images of an arm or hand within field of view 160. Computing device 200 determines, based on the input, a gesture corresponding to the input. In this example, if computing device 200 determines that the gesture corresponds to a "swipe left" gesture, computing device 200 connects or answers the call, enabling communication between one or more vehicle occupants and one or more other persons (e.g., Elizabeth in the illustration of FIG. 4B).

Figure 4D:
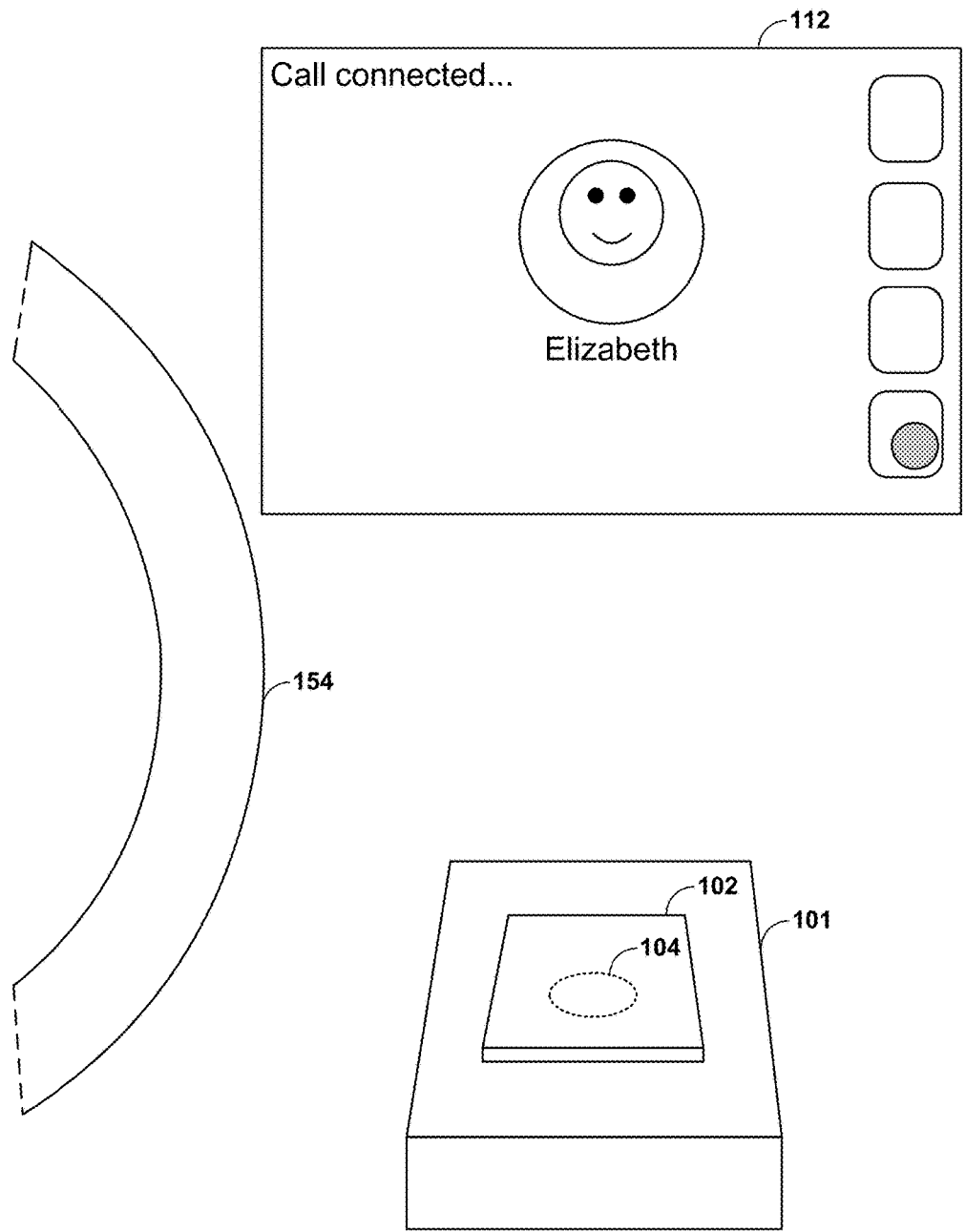
FIG. 4D is a conceptual diagram illustrating a perspective view from the rear of the interior of a vehicle, including an example vehicle computing system capable of providing feedback for gesture input in accordance with one or more aspects of the present disclosure.

FIG. 4D is a conceptual diagram illustrating a perspective view from the rear of the interior of a vehicle, including an example vehicle computing system 100 capable of providing feedback for gesture input in accordance with one or more aspects of the present disclosure. In the example of FIG. 4C, after computing device 200 connects or answers the call, computing device 200 may then update display 112 to provide feedback or visual confirmation that the call has been connected. See FIG. 4D. Again referring to the example of FIG. 4C, if computing device 200 determines, based on the input detected by camera 104, that the detected gesture corresponds to a "swipe right" gesture, computing device 200 might not connect the call, thereby disabling communication. In some examples, computing device 200 may in such a situation update display 112 to provide feedback or visual confirmation that the call has not been connected.

Referring again to FIG. 4C, the graphical user interface presented at display 112 includes cursor 306. In some examples, computing device 200 may control the movement of cursor 306 in response to input detected by camera 104, in a manner analogous to the manner in which computing device 200 controlled the movement of cursor 306 in response to input detected by presence-sensitive panel 102 in FIG. 3D, as previously described. For instance, camera 104 may detect input in the form of one or more images of an arm or hand within field of view 160. Computing device 200 may identify, based on the input, a direction of movement and a distance of movement. Responsive to such a determination, computing device 200 may move cursor 306 in the determined direction of movement and for the determined distance of movement within the graphical user interface presented at display 112. In one example, computing device 200 may move cursor 306 so that cursor 306 overlaps one of user interface elements 304.

After computing device 200 moves cursor 306 over one of user interface elements 304, camera 104 may detect input in the form of one or more images of an arm or hand within field of view 160, and computing device 200 may determine, based on this input at camera 104, that the input corresponds to selection of user interface element 304 overlapped by cursor 306. Alternatively, after cursor 306 is moved over one of user interface elements 304, presence-sensitive panel 102 may detect one or more taps or inputs at presence-sensitive panel 102, and computing device 200 may determine, based on this input at presence-sensitive panel 102, that the input corresponds to selection of user interface element 304 overlapped by cursor 306. Responsive to detecting input corresponding to selection of user interface element 304, computing device 200 may perform an operation corresponding to the user interface element 304 overlapped by cursor 306.

Figure 4E:
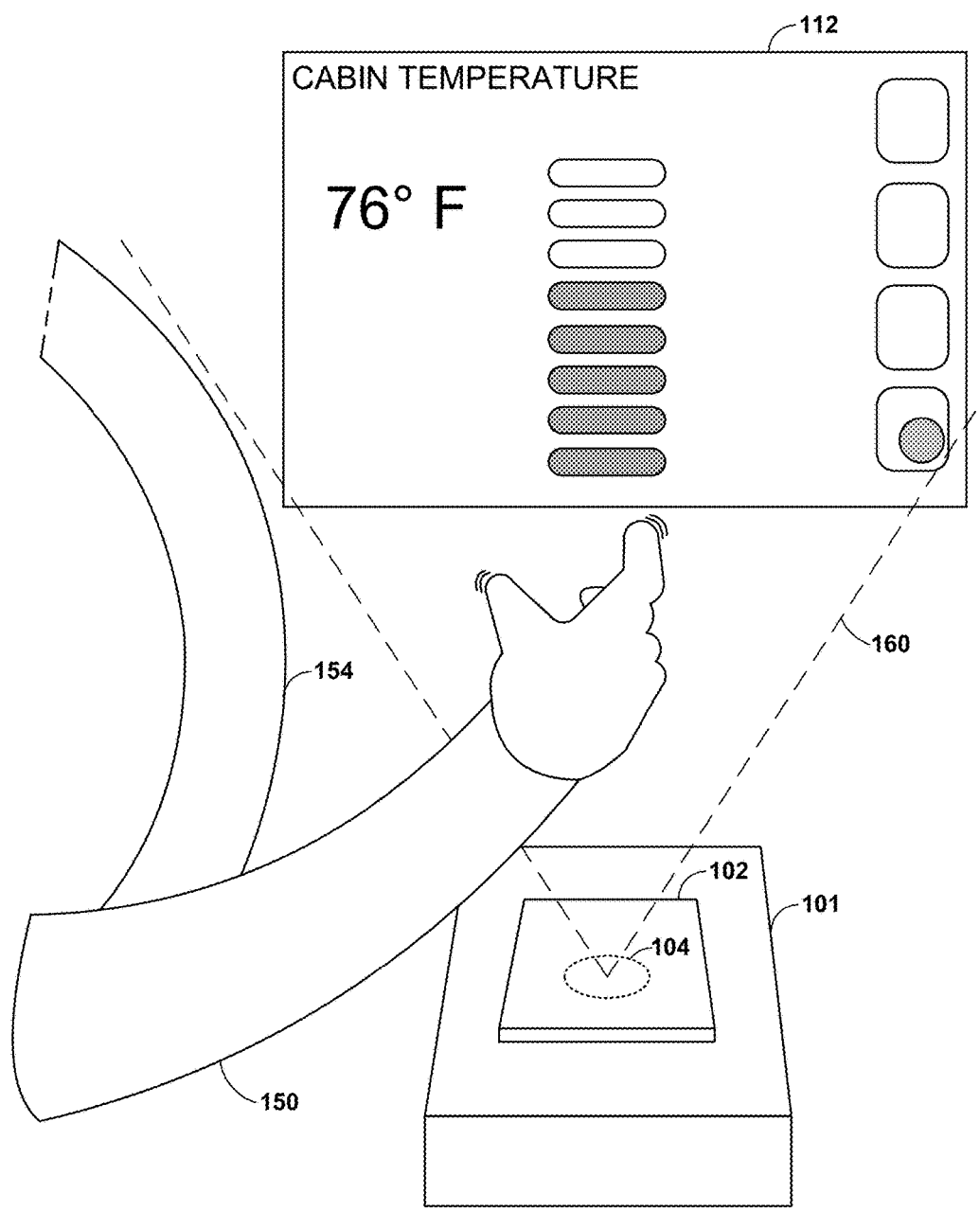
FIG. 4E is a conceptual diagram illustrating a perspective view from the rear of the interior of a vehicle, including an example vehicle computing system capable of detecting another type of gesture input in accordance with one or more aspects of the present disclosure.

FIG. 4E is a conceptual diagram illustrating a perspective view from the rear of the interior of a vehicle, including an example vehicle computing system 100 capable of detecting another type of gesture input in accordance with one or more aspects of the present disclosure. As in FIG. 4C and FIG. 4D, FIG. 4E illustrates center console 101 with camera 104 positioned on or within center console 101, with presence-sensitive panel 102 positioned on top of camera 104. Camera 104 may be an infrared camera, and presence-sensitive panel 102 may be transparent to infrared light.

In the example of FIG. 4E, computing device 200 is presenting an interface at display 112 for controlling cabin temperature. Camera 104 detects input in the form of one or more images of an arm or hand within field of view 160. Computing device 200 determines, based on the input, a gesture corresponding to the input. In this example, computing device 200 may determine that the gesture corresponds to fingers moving apart, which computing device 200 may interpret as an "increase" gesture. Computing device 200 may therefore interpret such a gesture as a command to increase the cabin temperature, and computing device 200 may increase a setting corresponding to the cabin temperature.

Computing device 200 may be configured to interpret input detected by camera 104 as a variety of gestures. Such gestures may include, but are not limited to, a swiping motion (e.g., as illustrated in FIG. 4B), a pinching motion of two fingers (e.g., as illustrated in FIG. 4E), a grasping and/or turning gesture (e.g., as might be used to remove a cap from a twist-off bottle), a knob-turning gesture, an upwards or downwards gesture, a movement gesture (e.g., from left to right, right to left, up to down, down to up, front to back, back to front), a pushing gesture, opening or closing a fist, a tapping gesture, a waving gesture, an opening or closing gesture, a clapping gesture, an open hand or open palm gesture, a splayed fingers gesture, a pointing gesture, and turning or reversing gesture, a clockwise or counterclockwise gesture, or a sliding, drag, or release gesture.

Figure 5:
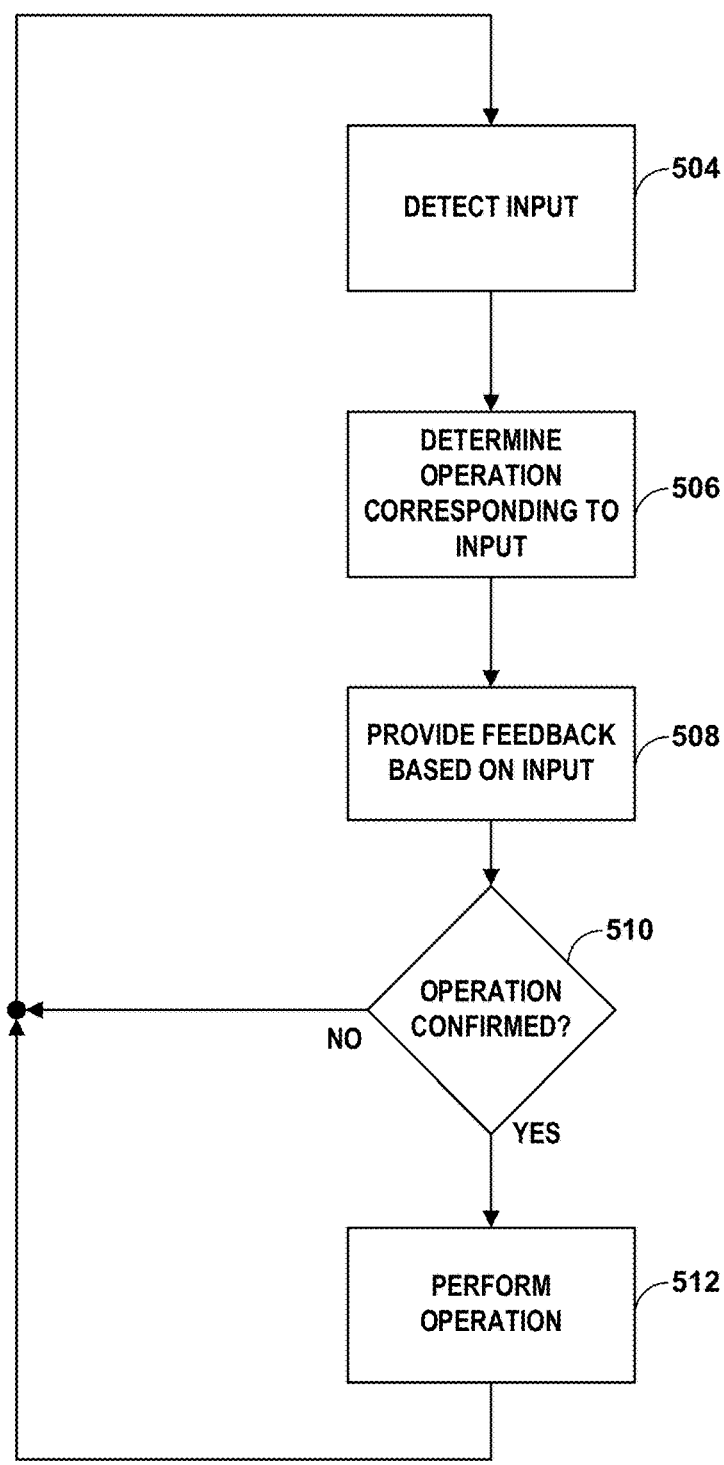
FIG. 5 is a flow diagram illustrating example operations of an example vehicle computing system that implements techniques for recognizing multiple types of input, in accordance with one or more aspects of the present disclosure.

FIG. 5 is a flow diagram illustrating example operations of an example vehicle computing system 100 that implements techniques for recognizing multiple types of input, in accordance with one or more aspects of the present disclosure. The process of FIG. 5 may be performed by one or more processors of a computing device, such as computing device 200 of FIG. 2. For purposes of illustration, FIG. 5 is described within the context of vehicle computing system 100 and computing device 200 of FIG. 1 and FIG. 2.

In the example of FIG. 5, computing device 200 may detect input from presence-sensitive panel 102, camera 104, or input devices 210 (504). For instance, presence-sensitive panel 102 may detect one or more taps, gestures, and/or other user inputs at locations of presence-sensitive panel 102, and/or camera 104 may detect images of one or more movements or gestures made within field of view 160. Computing device 200 may determine, based on the input, an operation corresponding to the input (506).

In some examples, computing device 200 may determine a gesture or operation based only on input detected by presence-sensitive panel 102 even though camera 104 may also detect input. For example, presence-sensitive panel 102 may detect a tap gesture (e.g., as a user moves a finger or stylus within a threshold distance of presence-sensitive panel 102) that computing device 200 determines corresponds to an input for adjusting seat position settings. In such an example, camera 104 may also detect the same tap gesture as the user moves the finger or stylus because the movement is within field of view 160. Despite camera 104 detecting the tap gesture, computing device 200 may determine that since presence-sensitive panel 102 detected the tap gesture, the input detected by camera 104 is duplicative, redundant, or otherwise not necessary and therefore should be disregarded or discarded.

In other examples, computing device 200 may determine a gesture or operation based only on input detected by camera 104 even though presence-sensitive panel 102 may also detect input. For example, presence-sensitive panel 102 may detect a hand gesture (e.g., as a user moves a hand beyond a threshold distance of presence-sensitive panel 102) within field of view 160 that computing device 200 determines corresponds to an input for tuning a radio to the next preset radio station. In such an example, presence-sensitive panel 102 may also detect aspects of the same hand gesture (e.g., if the hand gesture is near the threshold distance that computing device 200 may use to discern two-dimensional versus three-dimensional gestures). Even though presence-sensitive panel 102 may detect aspects of the same hand gesture, computing device 200 may determine that the input detected by camera 104 should be considered stronger or more significant, and therefore the input detected by presence-sensitive panel 102 is duplicative, redundant, or otherwise not necessary and therefore should be disregarded or discarded. In other words, even though presence-sensitive panel 102 may detect movements within field of view 160 if such movements are close enough to presence-sensitive panel 102 to be within the threshold distance of the surface of presence-sensitive panel 102, computing device 200 may disregard such movements if camera 104 also detects movements simultaneously occurring beyond the threshold distance of the surface of presence-sensitive panel 102.

In other examples, computing device 200 may determine a gesture or operation based on input detected by both presence-sensitive panel 102 and camera 104. In some examples, presence-sensitive panel 102 and camera 104 may detect input independently and/or simultaneously, and computing device 200 may determine, based on input detected by both devices, a gesture or operation. Computing device 200 may use input detected by presence-sensitive panel 102 to help confirm a gesture or operation determined based on input detected by camera 104, or computing device 200 may use input detected by camera 104 to help confirm a gesture or operation determined based on input detected by presence-sensitive panel 102. For example, computing device 200 may determine that input detected by presence-sensitive panel 102 likely corresponds to a particular tap gesture, and computing device 200 may evaluate input detected by camera 104 to ensure that such input is consistent with that tap gesture. For instance, computing device 200 may confirm that a hand was detected above presence-sensitive panel 102 in field-of-view 160, as would be expected for a tap gesture performed by a finger. If not, computing device 200 may determine that the input detected by presence-sensitive panel 102 was a different gesture or a false input.

In other examples, computing device 200 may determine a gesture, operation, or command based on input detected by both presence-sensitive panel 102 and camera 104 that might not be detectable (or as easily detectable) through input from only presence-sensitive panel 102 or input from only from camera 104. In other words, in such an example, computing device 200 may determine a gesture, operation, or command based on the combined input from both presence-sensitive panel 102 and camera 104. For example, one or more gestures could involve movements in both three-dimensional space within field of view 160 along with, or followed by, a movement in the approximately two-dimensional space on the surface of presence-sensitive panel 102. For instance, such a gesture may involve a hand or arm movement within field-of-view 160 ending in contact with the presence-sensitive panel 102.

In further examples, computing device 200 may determine an operation based on input from some combination of input detected by presence-sensitive panel 102, camera 104, and/or input devices 210. In such examples, computing device 200 may use input detected by input devices 210 to confirm input or a gesture or operation detected by presence-sensitive panel 102 and/or camera 104. In other examples, computing device 200 may use input detected by input devices 210, in combination with input detected by presence-sensitive panel 102 and camera 104, to determine a gesture, operation, or command based on the combined input.

In response to determining an operation, computing device 200 may provide feedback based on the input (508). Such feedback may be visual, or audio, or in another form. In some examples, computing device 200 may cause feedback to be presented at display 112. For instance, if computing device 200 determines that the operation corresponding to input is a request to provide guidance to a home address, computing device 200 may cause display 112 to display a prompt requesting confirmation that such an operation be initiated. In some examples, feedback may not be provided for some or all operations, and in such examples, providing feedback (508) may be optional.

Presence-sensitive panel 102, camera 104, and/or input devices 210 may detect further input confirming or declining the operation (510). If the operation is confirmed, computing device 200 may perform the operation (512). In some examples, after computing device 200 determines an operation to be performed, a confirmation step might not be performed, so confirming the operation (510) may be optional. For some operations, it may be more efficient to simply perform the operation without first requiring confirmation. In some examples, feedback may nevertheless be provided, even if confirmation is not required. For instance, if computing device 200 determines that the operation corresponding to detected input is a request to mute an audio system, computing device 200 may, in some examples, perform the muting operation, and may cause display 112 to present a notice that the audio system was muted in response to a user command.

Figure 6:
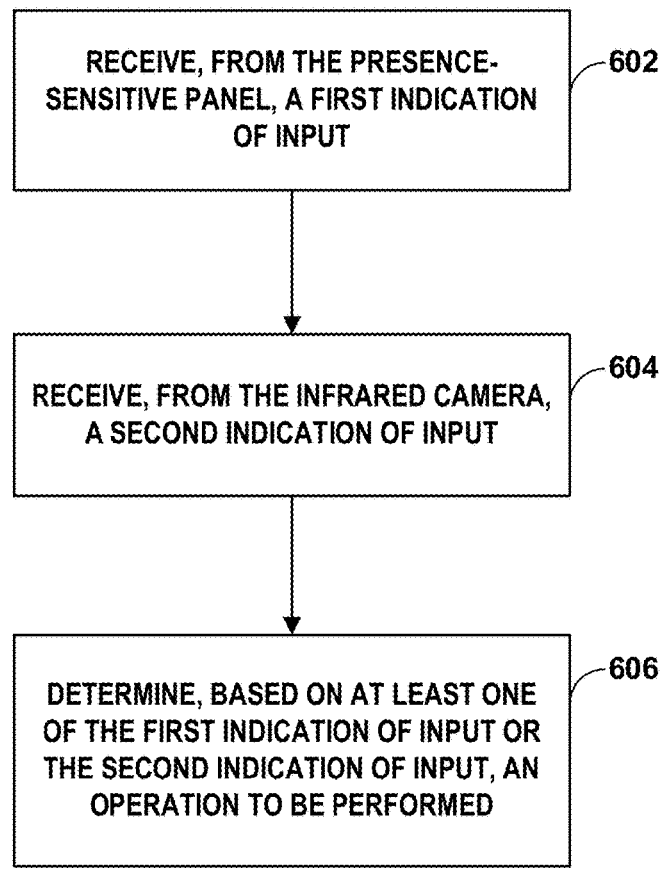
FIG. 6 is a flow diagram illustrating example operations of an example vehicle computing system that implements techniques for recognizing multiple types of input, in accordance with one or more aspects of the present disclosure.

FIG. 6 is a flow diagram illustrating example operations of an example vehicle computing system 100 that implements techniques for recognizing multiple types of input, in accordance with one or more aspects of the present disclosure. The operations of FIG. 6 may be performed by one or more processors of a computing device, such as computing device 200 of FIG. 2. For purposes of illustration, FIG. 6 is described within the context of vehicle computing system 100 and computing device 200 of FIG. 1 and FIG. 2.

In operation, computing device 200 may receive, from presence-sensitive panel 102, a first indication of input (602). For example, computing device 200 may detect one or taps or gestures at presence-sensitive panel 102 performed by the driver of the vehicle.

Computing device 200 may receive, from camera 104, a second indication of input (604). For example, camera 104 may detect one or more images of one or more movements or gestures made by a driver within field of view 160.

Computing device 200 may determine, based on at least one of the first indication of input or the second indication of input, an operation to be performed. For example, computing device 200 may determine that the input from either presence-sensitive panel 102, or camera 104 (or both) correspond to a particular operation, such as starting a navigation application.

Clause 1. A computing system of a vehicle comprising: a presence-sensitive panel within vehicle; an infrared camera configured to capture images in a three-dimensional space within the vehicle; at least one processor; and at least one storage device that stores instructions that, when executed, cause the at least one processor to: receive, from the presence-sensitive panel, a first indication of input, receive, from the infrared camera, a second indication of input, and determine, based on at least one of the first indication of input or the second indication of input, an operation to be performed.

Clause 2. The computing system of clause 1, wherein the presence-sensitive panel is positioned between the infrared camera and the three-dimensional space and is transparent to infrared; and wherein the infrared camera is positioned under the presence-sensitive panel and is oriented to capture images in the three-dimensional space above the presence-sensitive panel.

Clause 3. The computing system of clause 2, wherein the presence-sensitive panel is positioned substantially horizontally on a central console of the vehicle.

Clause 4. The computing system of any of clauses 1-3, wherein the presence-sensitive panel is configured to detect two-dimensional gesture inputs performed within a threshold distance of the presence-sensitive panel; and wherein the infrared camera is configured to detect three-dimensional gesture inputs performed beyond the threshold distance of the input surface of the presence-sensitive panel and in the three-dimensional space.

Clause 5. The computing system of clause any of clauses 1-4, wherein determining the operation to be performed is based on both the first indication of input and the second indication of input.

Clause 6. The computing system of any of clauses 1-5, wherein determining the operation to be performed is based on the first indication of input.

Clause 7. The computing system of clause 6, wherein the operation to be performed is a first operation to be performed, and wherein the instructions, when executed, further cause the at least one processor to: responsive to determining the first operation to be performed, output, for display, information about the first operation to be performed; determine, based on the second indication of input, a second operation to be performed; and responsive to determining the second operation to be performed, output, for display, information about the second operation to be performed.

Clause 8. The computing system of clause 6, further comprising a display screen, wherein the operation to be performed is a first operation to be performed, and wherein the instructions, when executed, further cause the at least one processor to: responsive to determining the first operation to be performed, display on the display screen information about the first operation to be performed; determine, based on the second indication of input, a second operation to be performed; and responsive to determining the second operation to be performed, display on the display screen information about the second operation to be performed.

Clause 9. The computing system of clause 6, further comprising a display screen, and wherein the instructions, when executed, further cause the at least one processor to: responsive to determining the operation to be performed and prior to receiving the second indication of input, display on the display screen information requesting confirmation to perform the operation; determine, based on the second indication of input, that the operation should be performed; and perform the operation.

Clause 10. The computing system of clause 6, wherein the three-dimensional space has high ambient light conditions, and wherein determining the operation to be performed is based on the second indication of input and includes determining gestures from images captured by the infrared camera in the high ambient light conditions.

Clause 11. The computing system of clause 6, wherein the three-dimensional space has low ambient light conditions, and wherein determining the operation to be performed is based on the second indication of input and includes determining gestures from images captured by the infrared camera in the low ambient light conditions.

Clause 12. The computing system of clause 6, wherein the three-dimensional space includes structure in a field of view of the infrared camera, and wherein determining the operation to be performed is based on the second indication of input and includes discerning gestures from the structure in the field of view.

Clause 13. A method comprising: receiving, by a computing system of a vehicle, from a presence-sensitive panel positioned within the vehicle, a first indication of input; receiving, by the computing system, from an infrared camera configured to capture images in a three-dimensional space within the vehicle, a second indication of input; and determining, based on at least one of the first indication of input or the second indication of input, an operation to be performed.

Clause 14. The method of clause 13, wherein the presence-sensitive panel is positioned between the infrared camera and the three-dimensional space and is transparent to infrared; and wherein the infrared camera is positioned under the presence-sensitive panel and is oriented to capture images in the three-dimensional space above the presence-sensitive panel.

Clause 15. The method of clause 14, wherein the presence-sensitive panel is positioned substantially horizontally on a central console of the vehicle.

Clause 16. The method of any of clauses 13-15, wherein the presence-sensitive panel is configured to detect two-dimensional gesture inputs performed within a threshold distance of the presence-sensitive panel; and wherein the infrared camera is configured to detect three-dimensional gesture inputs performed beyond the threshold distance of the input surface of the presence-sensitive panel and in the three-dimensional space.

Clause 17. The method of any of clauses 13-16, wherein determining the operation to be performed is based on both the first indication of input and the second indication of input.

Clause 18. The method of any of clauses 13-17, wherein determining the operation to be performed is based on the first indication of input.

Clause 19. The method of clause 18, wherein the operation to be performed is a first operation to be performed, the method further comprising: responsive to determining the first operation to be performed, outputting, for display, information about the first operation to be performed; determining, based on the second indication of input, a second operation to be performed; and responsive to determining the second operation to be performed, outputting, for display, information about the second operation to be performed.

Clause 20. A computer-readable storage medium comprising instructions that, when executed by a computing system of a vehicle, cause at least one processor of the computing system to: receive, from a presence-sensitive panel positioned within the vehicle, a first indication of input; receive, from an infrared camera configured to capture images in a three-dimensional space within the vehicle, a second indication of input; and determine, based on at least one of the first indication of input or the second indication of input, an operation to be performed.

Clause 21. A computing system comprising means for performing any of the methods of clauses 13-19.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples may be within the scope of one or more of the following claims.

What is claimed is:

1. A computing system of a vehicle comprising:
a presence-sensitive panel positioned substantially horizontally on a central console of the vehicle;
an infrared camera configured to capture images in a three-dimensional space within the vehicle, the infrared camera being positioned under the presence-sensitive panel and being oriented to capture images in the three-dimensional space above the presence-sensitive panel;
at least one processor; and
at least one storage device that stores instructions that, when executed, cause the at least one processor to:
receive, from the presence-sensitive panel, a first indication of input,
receive, from the infrared camera, a second indication of input, and
determine, based on at least one of the first indication of input or the second indication of input, an operation to be performed.

2. The computing system of claim 1,
wherein the presence-sensitive panel is positioned between the infrared camera and the three-dimensional space and is transparent to infrared.

3. The computing system of claim 1,
wherein the presence-sensitive panel is configured to detect two-dimensional gesture inputs performed within a threshold distance of the presence-sensitive panel; and
wherein the infrared camera is configured to detect three-dimensional gesture inputs performed beyond the threshold distance of an input surface of the presence-sensitive panel and in the three-dimensional space.

4. The computing system of claim 1, wherein determining the operation to be performed is based on both the first indication of input and the second indication of input.

5. The computing system of claim 1, wherein determining the operation to be performed is based on the first indication of input.

6. The computing system of claim 5, wherein the operation to be performed is a first operation to be performed, and wherein the instructions, when executed, further cause the at least one processor to:
responsive to determining the first operation to be performed, output, for display, information about the first operation to be performed;
determine, based on the second indication of input, a second operation to be performed; and
responsive to determining the second operation to be performed, output, for display, information about the second operation to be performed.

7. The computing system of claim 5, further comprising a display screen, wherein the operation to be performed is a first operation to be performed, and wherein the instructions, when executed, further cause the at least one processor to:
responsive to determining the first operation to be performed, display on the display screen information about the first operation to be performed;
determine, based on the second indication of input, a second operation to be performed; and
responsive to determining the second operation to be performed, display on the display screen information about the second operation to be performed.

8. The computing system of claim 5, further comprising a display screen, and wherein the instructions, when executed, further cause the at least one processor to:
responsive to determining the operation to be performed and prior to receiving the second indication of input, display on the display screen information requesting confirmation to perform the operation;
determine, based on the second indication of input, that the operation should be performed; and
perform the operation.

9. The computing system of claim 5,
wherein the three-dimensional space has high ambient light conditions, and
wherein determining the operation to be performed is based on the second indication of input and includes determining gestures from images captured by the infrared camera in the high ambient light conditions.

10. The computing system of claim 5,
wherein the three-dimensional space has low ambient light conditions, and
wherein determining the operation to be performed is based on the second indication of input and includes determining gestures from images captured by the infrared camera in the low ambient light conditions.

11. The computing system of claim 5,
wherein the three-dimensional space includes structure in a field of view of the infrared camera, and
wherein determining the operation to be performed is based on the second indication of input and includes discerning gestures from the structure in the field of view.

12. A method comprising:
receiving, by a computing system of a vehicle, from a presence-sensitive panel positioned substantially horizontally on a central console of the vehicle, a first indication of input;
receiving, by the computing system, from an infrared camera configured to capture images in a three-dimensional space within the vehicle, a second indication of input, wherein the infrared camera is positioned under the presence-sensitive panel and is oriented to capture images in the three-dimensional space above the presence-sensitive panel; and
determining, based on at least one of the first indication of input or the second indication of input, an operation to be performed.

13. The method of claim 12,
wherein the presence-sensitive panel is positioned between the infrared camera and the three-dimensional space and is transparent to infrared.

14. The method of claim 12,
wherein the presence-sensitive panel is configured to detect two-dimensional gesture inputs performed within a threshold distance of the presence-sensitive panel; and
wherein the infrared camera is configured to detect three-dimensional gesture inputs performed beyond the threshold distance of an input surface of the presence-sensitive panel and in the three-dimensional space.

15. The method of claim 12, wherein determining the operation to be performed is based on both the first indication of input and the second indication of input.

16. The method of claim 12, wherein determining the operation to be performed is based on the first indication of input.

17. The method of claim 16, wherein the operation to be performed is a first operation to be performed, the method further comprising:
responsive to determining the first operation to be performed, outputting, for display, information about the first operation to be performed;
determining, based on the second indication of input, a second operation to be performed; and
responsive to determining the second operation to be performed, outputting, for display, information about the second operation to be performed.

18. A non-transitory computer-readable storage medium comprising instructions that, when executed by a computing system of a vehicle, cause at least one processor of the computing system to:
receive, from a presence-sensitive panel positioned substantially horizontally on a central console of the vehicle, a first indication of input;
receive, from an infrared camera configured to capture images in a three-dimensional space within the vehicle, a second indication of input, wherein the infrared camera is positioned under the presence-sensitive panel and is oriented to capture images in the three-dimensional space above the presence-sensitive panel; and
determine, based on at least one of the first indication of input or the second indication of input, an operation to be performed.

* * * * *